(12) United States Patent
Okumura et al.

(10) Patent No.: US 7,676,528 B2
(45) Date of Patent: Mar. 9, 2010

(54) IMAGE DATA PROCESSING APPARATUS AND IMAGE DATA PROCESSING METHOD

(75) Inventors: Haruhiko Okumura, Fujisawa (JP); Tetsuro Itakura, Tokyo (JP); Hironori Minamizaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1203 days.

(21) Appl. No.: 11/231,762

(22) Filed: Sep. 22, 2005

(65) Prior Publication Data
US 2006/0221099 A1 Oct. 5, 2006

(30) Foreign Application Priority Data
Mar. 31, 2005 (JP) ............ P2005-104011

(51) Int. Cl.
*G09G 5/00* (2006.01)
(52) U.S. Cl. .................. 708/200; 345/643
(58) Field of Classification Search ......... 345/100–105; 708/191, 490, 700–705
See application file for complete search history.

(56) References Cited
U.S. PATENT DOCUMENTS

| | | | | |
|---|---|---|---|---|
| 5,047,975 | A * | 9/1991 | Patti et al. ............ | 708/706 |
| 5,986,635 | A * | 11/1999 | Naka et al. ............ | 715/716 |
| 6,344,850 | B1 * | 2/2002 | Okumura et al. ........ | 345/204 |
| 7,239,078 | B2 * | 7/2007 | No ..................... | 313/497 |
| 7,495,646 | B2 * | 2/2009 | Kawabe et al. ......... | 345/95 |
| 2006/0059218 | A1 * | 3/2006 | Hammond et al. ....... | 708/301 |
| 2006/0184596 | A1 * | 8/2006 | Volleberg et al. ........ | 708/300 |

FOREIGN PATENT DOCUMENTS

| | | |
|---|---|---|
| GB | 2 097 637 A | 11/1982 |
| JP | 6-332434 | 12/1994 |
| JP | 8-304763 | 11/1996 |
| JP | 2000-20031 | 1/2000 |
| JP | 2002-366107 | 12/2002 |
| JP | 2003-131627 | 5/2003 |
| JP | 2003-195821 | 7/2003 |
| JP | 2004-177743 | 6/2004 |

OTHER PUBLICATIONS

Notification of Transmittal of the International Search Report and the Written Opinion of the International Searching Authority or the Declaration, issued by the Japanese Patent Office, mailed Dec. 27, 2005, for International Application No. PCT/JP2005/017918.

(Continued)

*Primary Examiner*—Lewis A Bullock, Jr.
*Assistant Examiner*—Kevin Hughes
(74) *Attorney, Agent, or Firm*—Finnegan, Henderson, Farabow, Garrett & Dunner, L.L.P.

(57) ABSTRACT

An image data processing apparatus includes: a data dividing unit dividing arithmetic image data into arithmetic pixel data corresponding to a signal line of a display device; an adder adding first data and second data; and a data delaying unit delaying the added data, wherein the first data is the divided arithmetic pixel data from the data dividing unit, and the second data is the delayed added arithmetic pixel data from the data delaying unit.

1 Claim, 26 Drawing Sheets

OTHER PUBLICATIONS

International Search Report, issued by the Japanese Patent Office, mailed Dec. 27, 2005, for International Application No. PCT/JP2005/017918.

Written Opinion of the International Searching Authority, issued by the Japanese Patent Office, mailed Dec. 27, 2005, for International Application No. PCT/JP2005/017918.

International Preliminary Report on Patentability and Written Opinion issued by the International Bureau of WIPO on Oct. 11, 2007, for International Patent Application No. PCT/JP2005/017918.

European Search Report dated May 26, 2009.

* cited by examiner

FIG. 30

| BEFORE CONVERSION | AFTER CONVERSION | REPRODUCTION SIGNAL | ERROR |
|---|---|---|---|
| 0 | 0 | 0 | 0 |
| 1 | 1 | 1 | 0 |
| 2 | 2 | 2 | 0 |
| 3 | 2 | 2 | 1 |
| 4 | 3 | 5 | 1 |
| 5 | 3 | 5 | 0 |
| 6 | 3 | 5 | 1 |
| 7 | 4 | 8 | 1 |
| 8 | 4 | 8 | 0 |
| 9 | 4 | 8 | 1 |
| 10 | 4 | 8 | 2 |
| 11 | 5 | 13 | 2 |
| 12 | 5 | 13 | 1 |
| 13 | 5 | 13 | 0 |
| 14 | 5 | 13 | 1 |
| 15 | 5 | 13 | 2 |
| 16 | 6 | 18 | 2 |
| 17 | 6 | 18 | 1 |
| 18 | 6 | 18 | 0 |
| 19 | 6 | 18 | 1 |
| 20 | 6 | 18 | 2 |
| 21 | 6 | 18 | 3 |
| 22 | 7 | 26 | 4 |
| 23 | 7 | 26 | 3 |
| 24 | 7 | 26 | 2 |
| 25 | 7 | 26 | 1 |
| 26 | 7 | 26 | 0 |
| 27 | 7 | 26 | 1 |
| 28 | 7 | 26 | 2 |
| 29 | 7 | 26 | 3 |
| 30 | 7 | 26 | 4 |
| 31 | 7 | 26 | 5 |

6 BITS * NUMBER OF HORIZONTAL PIXELS/2

IMAGE DATA PROCESSING APPARATUS AND IMAGE DATA PROCESSING METHOD

CROSS REFERENCE TO THE INVENTION

This application is based upon and claims the benefit of priority from the prior Japanese Patent Application No. 2005-104011, filed on Mar. 31, 2005; the entire contents of which are incorporated herein by reference.

BACKGROUND OF THE INVENTION

1. Field of the Invention

The present invention relates to an image data processing apparatus and an image data processing method.

2. Description of the Related Art

As the size of a screen of the display device has become larger and its definition has become higher, more information volume has become necessary for driving a display device, and as a result, the frequency of a signal transmitted for driving the display device is becoming higher. Such an increase in data volume of the transmission signal (increase in frequency) will be a cause of EMI (Electro Magnetic Interference) to the vicinity of the display device. Therefore, a need for reducing the EMI ascribable to an electronic device having a display device has been increasing. As a method of reducing the EMI generated from an electronic device having a display device, "LVDS", "Panel Link", "SSCG", and the like have been proposed (Nikkei Electronics, 1997.11.3 (no. 702), P123-P148).

SUMMARY OF THE INVENTION

The methods of "LVDS" and the like are capable of reducing EMI, but involve the possibility of a need for a relatively large-scale additional circuit or of an increase in driving frequency. For example, the "LVDS" and "Panel Link" reduce voltage of image data or the like but make a driving frequency higher. Meanwhile, there is an increasing demand for lower power consumption mainly in a mobile device such as a notebook personal computer and a cellular phone. In the mobile device, about half of its power consumption is attributed to its display device, and therefore, there is a strong demand for lowering power consumption of the display device.

In view of the above, it is an object of the present invention to provide an image data processing apparatus and an image data processing method capable of effectively reducing the occurrence of an electromagnetic wave.

An image data processing apparatus according to one embodiment of the present invention includes: a data dividing unit configured to divide arithmetic image data including arithmetic pixel data into arithmetic pixel data corresponding to a signal line of a display device; an adder having a first terminal to which first data is applied and a second terminal to which second data is applied, and configured to add the first data and the second data; and a data delaying unit configured to delay the added data, wherein the first data is the divided arithmetic pixel data from the data dividing unit, the second data is the delayed added arithmetic pixel data from the data delaying unit, and the added data is pixel data corresponding to the signal line.

BRIEF DESCRIPTION OF THE DRAWINGS

FIG. 30 is a schematic view showing a concrete example of a nonlinear conversion table.

DESCRIPTION OF THE EMBODIMENTS

Hereinafter, embodiments of the present invention will be described in detail with reference to the drawings.

First Embodiment

Figure 1:
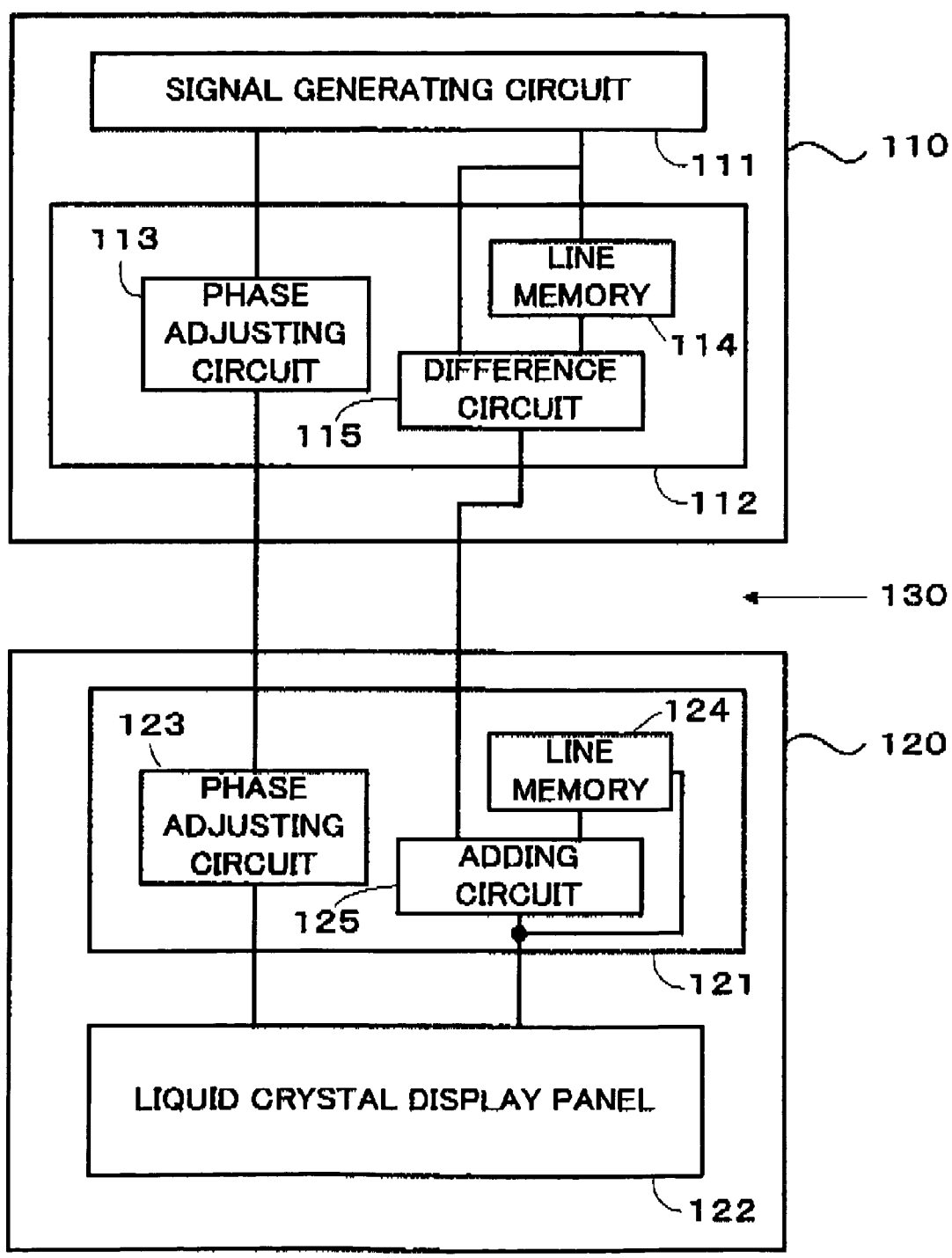
FIG. 1 is a block diagram showing a display system according to a first embodiment of the present invention.

FIG. 1 is a block diagram showing a display system 100 according to a first embodiment of the present invention. The display system 100 includes a display control device 110, a display device 120, and signal lines 130.

The display control device 110, which is, for example, a computer, generates signals for driving the display device 120 and includes a signal generating circuit 111 and a difference data transmitting circuit 112. The display device 120, which is, for example, a liquid crystal display device, displays an image based on the driving signals sent from the display control device 110, and includes a difference data receiving circuit 121 and a display panel 122. The signal lines 130 transmit the signals (clock signals, control signals, and image data) for driving the display device 120.

The signal generating circuit 111 generates various kinds of signals (the clock signals, the control signals, and the image data) based on which the display panel 122 performs display, and can be constituted by, for example, a graphics controller LSI (WD90C24A or the like) or a gate array in a TFT module. Formats of the clock signals, the control signals, the image data, and so on are described in, for example, Timing Chart in "Toshiba General Catalog of Liquid Crystal Display Module '94 version p13, 15, 17, 19" (NCLK corresponds to the clock signal, ENAB corresponds to the control signal, and R7-R0/G7-G0/B7-B0 correspond to the image data) or in Source Drivers in "Data Book LCDTFT Driver 1997 (TEXAS INSTRUMENTS)" (CLK corresponds to the clock signal, 1/EI02/REV and the like correspond to the control signals, and D00-D07/D10-D17/D20-D27 correspond to the image data).

The difference data transmitting circuit 112 converts image data to difference data. Further, the difference data transmitting circuit 112 adjusts phases of the clock signals, the control signals, and the difference data so that the display panel 122 performs normal display. The difference data transmitting circuit 112 includes a phase adjusting circuit 113, a line memory 114, and a difference circuit 115.

The phase adjusting circuit 113 adjusts the phases of the clock signals, the control signals, and the image data so that the display panel 122 performs normal display.

The line memory 114 temporarily retains the image data sent from the signal generating circuit 111 to output the retained image data (hereinafter, referred to as "previous image data"). Specifically, the line memory 114 outputs the previous image data, delaying it by a predetermined period (delaying the phase) from an input timing of the image data sent from the signal generating circuit 111. The predetermined period (delay time) may be one scan line period (also called a scan time, a horizontal display period, or a horizontal scan period). The one scan line period is adopted as the delay time because of the fact that in typical display images (the Internet, games, mail, text, and the like), a change of image data is small in a vertical direction. Incidentally, this transmission technique can be called a vertical difference transmission method.

The difference circuit 115 generates the difference data (a kind of arithmetic pixel data) from the image data and the previous image data.

The difference data receiving circuit 121 inverse-converts the difference data to the original image data. Further, the difference data receiving circuit 121 adjusts the phases of the clock signals, the control signals, and the difference data so that the display panel 122 performs normal display. The difference data receiving circuit 121 includes a phase adjusting circuit 123, a line memory 124, and an adding circuit 125.

The phase adjusting circuit 123 adjusts the phases of the clock signals, the control signals, and the image data so that the display panel 122 performs normal display.

The line memory 124 temporarily retains the image data sent from the adding circuit 125 to output the retained image data (previous image data). Specifically, the line memory 124 outputs the previous image data, delaying it by a predetermined period (delaying its phase) from the input timing of the image data from the adding circuit 125. The predetermined period (delay time) may be one scan line period, similarly to that in the line memory 114.

The adding circuit 125 generates the image data from the difference data and the previous image data.

Figure 2:
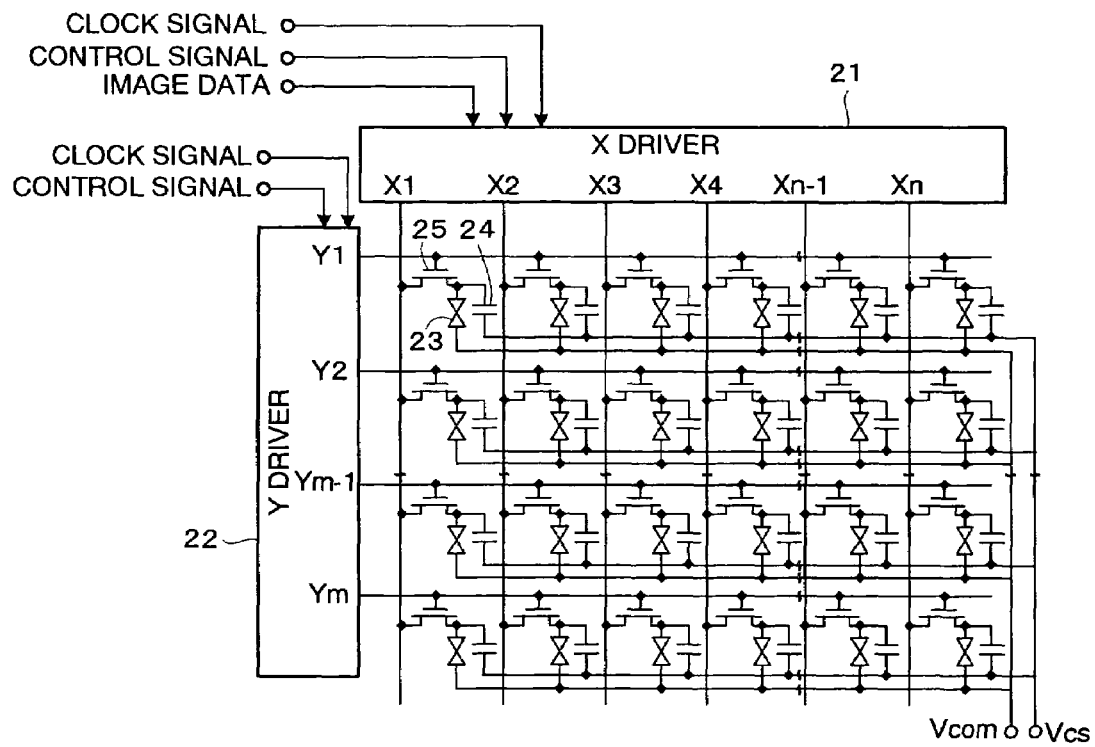
FIG. 2 is a schematic view showing a configuration example of an active-matrix liquid crystal display device as an example of a display panel.

The display panel 122 displays an image based on the clock signals, the control signals, and the image data. FIG. 2 is a schematic view showing a configuration example of an active-matrix liquid crystal display device 20 as an example of the display panel 122. Here, as the active-matrix liquid crystal display device 20, a thin-film transistor liquid crystal display device (TFT-LCD) is shown. The active-matrix liquid crystal display device 20 includes an X driver 21, a Y driver 22, liquid crystal capacitors 23, auxiliary capacitors 24, TFTs 25, signal lines X1-Xn, and gate lines Y1-Ym.

Figure 3:
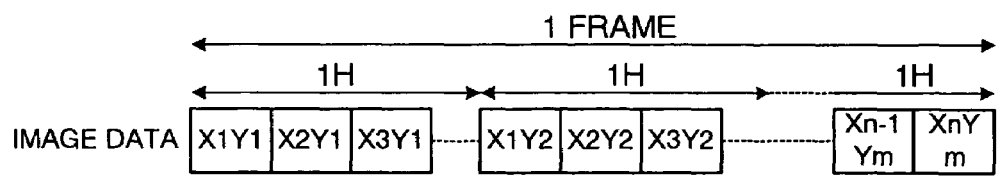
FIG. 3 is a schematic view showing image data outputted from a signal generating circuit.
Figure 4:
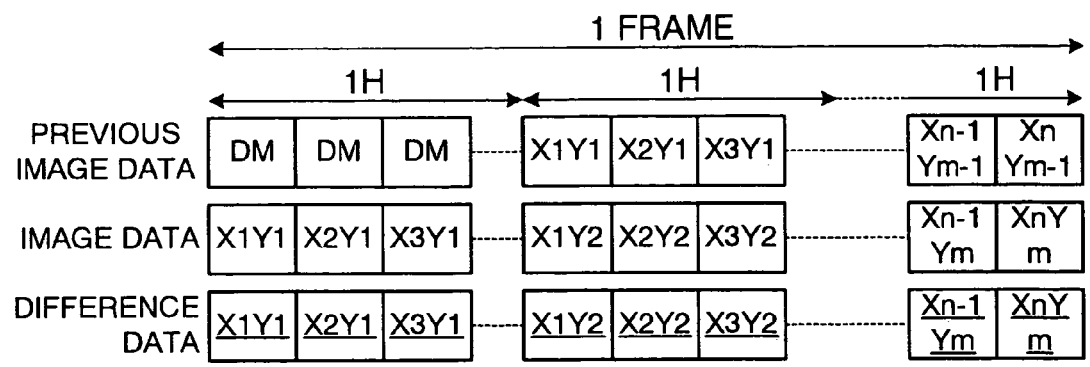
FIG. 4 is a view showing difference data outputted from a difference data transmitting circuit.
Figure 5:
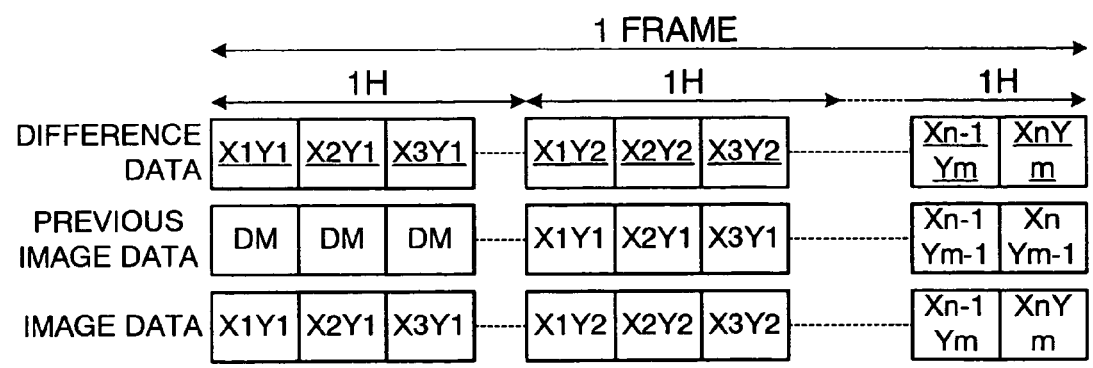
FIG. 5 is a view showing image data reproduced in a difference data receiving circuit.

FIG. 3 to FIG. 5 are schematic views schematically showing the image data. Here, 1H represents one scan line period and one frame corresponds to a frame period, a vertical display period, or the like. "X1Y1" or the like represents, for example, the image data corresponding to a pixel controlled by the signal line X1 and the gate line Y1. Further, the underlined "X1Y1" or the like represents, for example, the difference data corresponding to the pixel controlled by the signal line X1 and the gate line Y1.

FIG. 3 is schematic view showing the image data outputted from the signal generating circuit 111. The signal lines X1-Xn are scanned in the one scan line period. The signal lines are repeatedly scanned in one frame period, and as a result, the gate lines Y1-Ym are scanned. FIG. 4 is a view showing the difference data outputted from the difference data transmitting circuit 112, in contrast to the image data and the previous image data, which is the delayed image data. FIG. 5 is a view showing the image data reproduced in the difference data receiving circuit 121, in contrast to the difference data and the previous image data, which is the delayed image data.

<Operation of Display System 100>

Hereinafter, image data processing in the display system 100 will be described in detail.

Image data (see, FIG. 3) outputted from the signal generating circuit 111 is sent to the difference data transmitting circuit 112. The image data is inputted to the line memory 114 and the difference circuit 115. The image data inputted to the line memory 114 is outputted, being delayed by one scan line period, to become previous image data (see, FIG. 4). "X1Ym-XnYm" can be used as the previous image data for the image data "X1Y1-XnY1". However, in the example in FIG. 4, dummy data DM (low as signals) are used as the previous image data for the image data "X1Y1-XnY1".

The difference circuit 115 generates difference data by exclusive-OR'ing the previous image data and the image data. The difference data is outputted from the difference data transmitting circuit 112 to be inputted to the difference data receiving circuit 121. The adding circuit 125 in the difference data receiving circuit 121 reproduces the image data by exclusive-OR'ing the previous image data and the difference data.

As shown in FIG. 4 and FIG. 5, the timings of the difference data, the previous image data, and the image data are substantially the same and correspond to the scan line period. However, a slight difference can occur among these timings, depending on a circuit configuration of the difference data receiving circuit 121 and so on, as will be described later.

Figure 6:
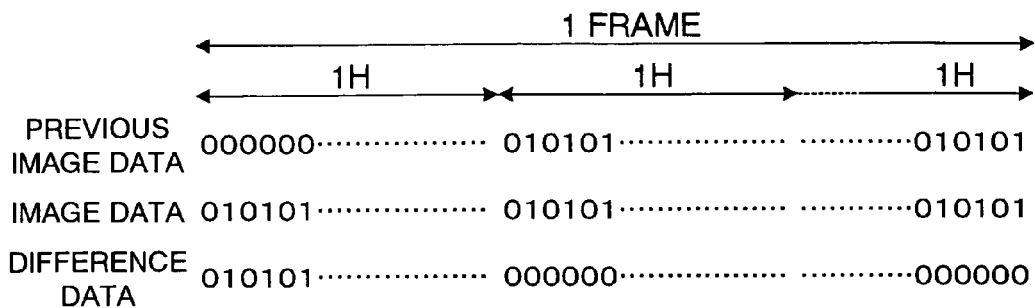
FIG. 6 is a view showing an example of the difference data outputted from the difference data transmitting circuit.
Figure 7:
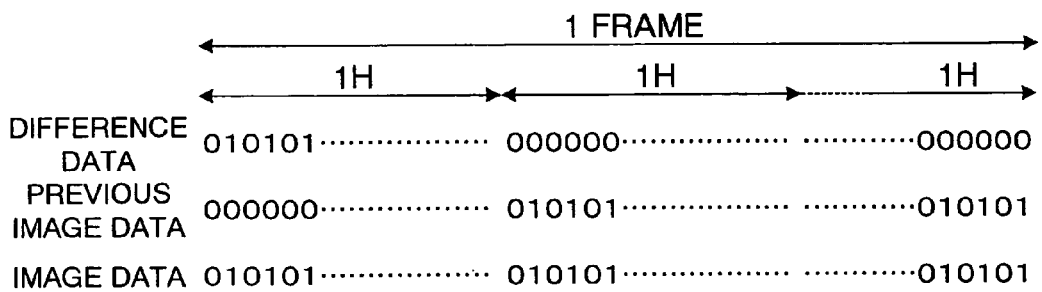
FIG. 7 is a view showing an example of the image data outputted from the difference data receiving circuit.
Figure 8:
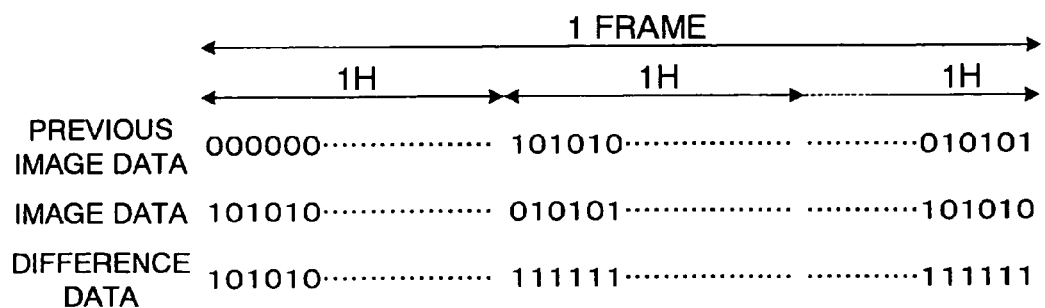
FIG. 8 is a view showing another example of the difference data outputted from the difference data transmitting circuit.

FIG. 6 to FIG. 8 are views showing concrete examples of the image data. FIG. 6 is a view showing an example of the difference data outputted from the difference data transmitting circuit 112. FIG. 7 is a view showing an example of the image data outputted from the difference data receiving circuit 121. FIG. 8 is a view showing another example of the difference data outputted from the difference data transmitting circuit 112. "0" and "1" in FIG. 6 to FIG. 8 indicate whether the difference data, the image data, and the previous image data are high or low in digital signals.

In the case of the image data in FIG. 6 (a display pattern of white or black appearing every other signal line), since the difference data is low substantially throughout the entire one frame period, its data transition (change of data state from high to low or from low to high) is less frequent than that of the image data. Similarly, in the case of the image data in FIG. 8 (checker display pattern), the difference data is high substantially throughout the entire one frame period, and its data transition is less frequent than that of the image data. The use of the difference data in a portion where a cable length is long and electromagnetic wave radiation causes a problem can reduce the intensity of the electromagnetic wave radiation, power consumption, and the like, compared with the use of the image data.

CIRCUIT CONFIGURATION EXAMPLE 1

Figure 9:
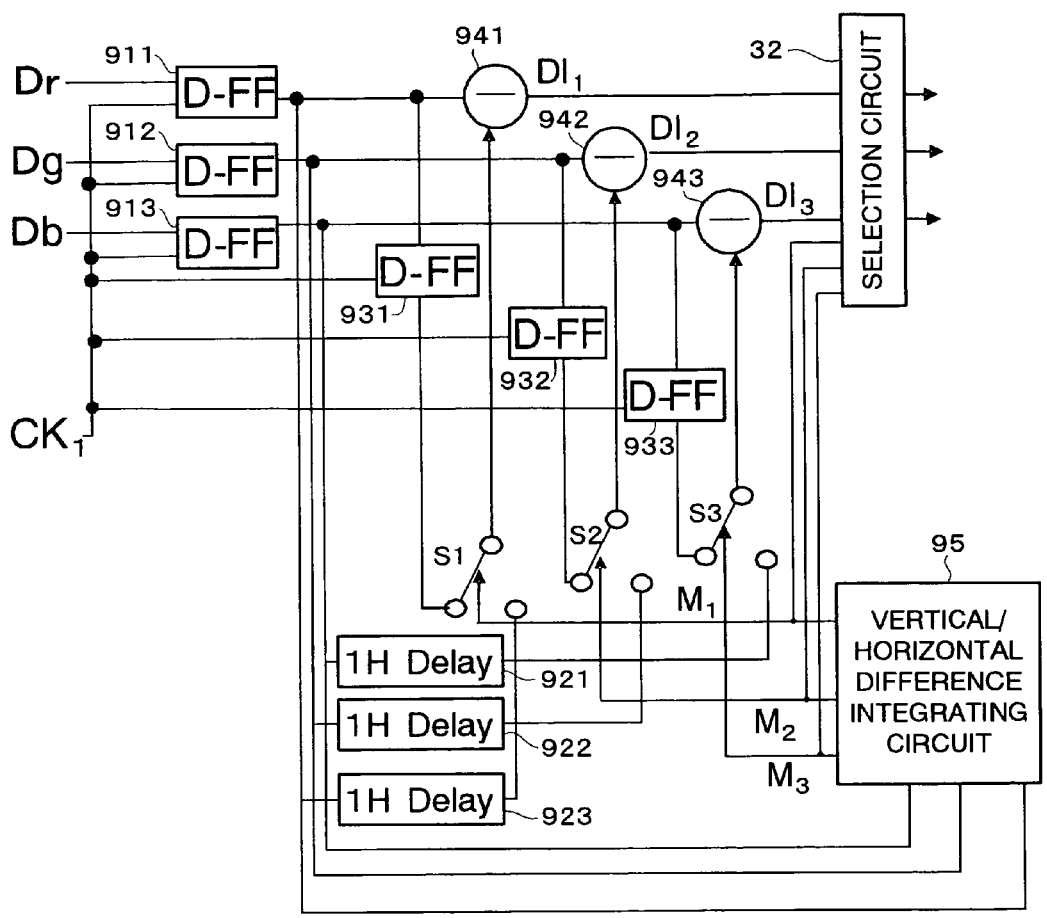
FIG. 9 is a view showing an example of a circuit configuration of the difference data transmitting circuit.
Figure 10:
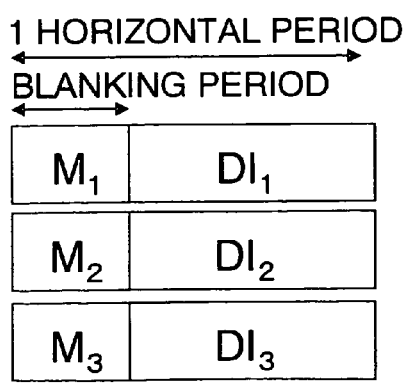
FIG. 10 is a schematic view showing signals outputted from the circuit in FIG. 9.
Figure 11:
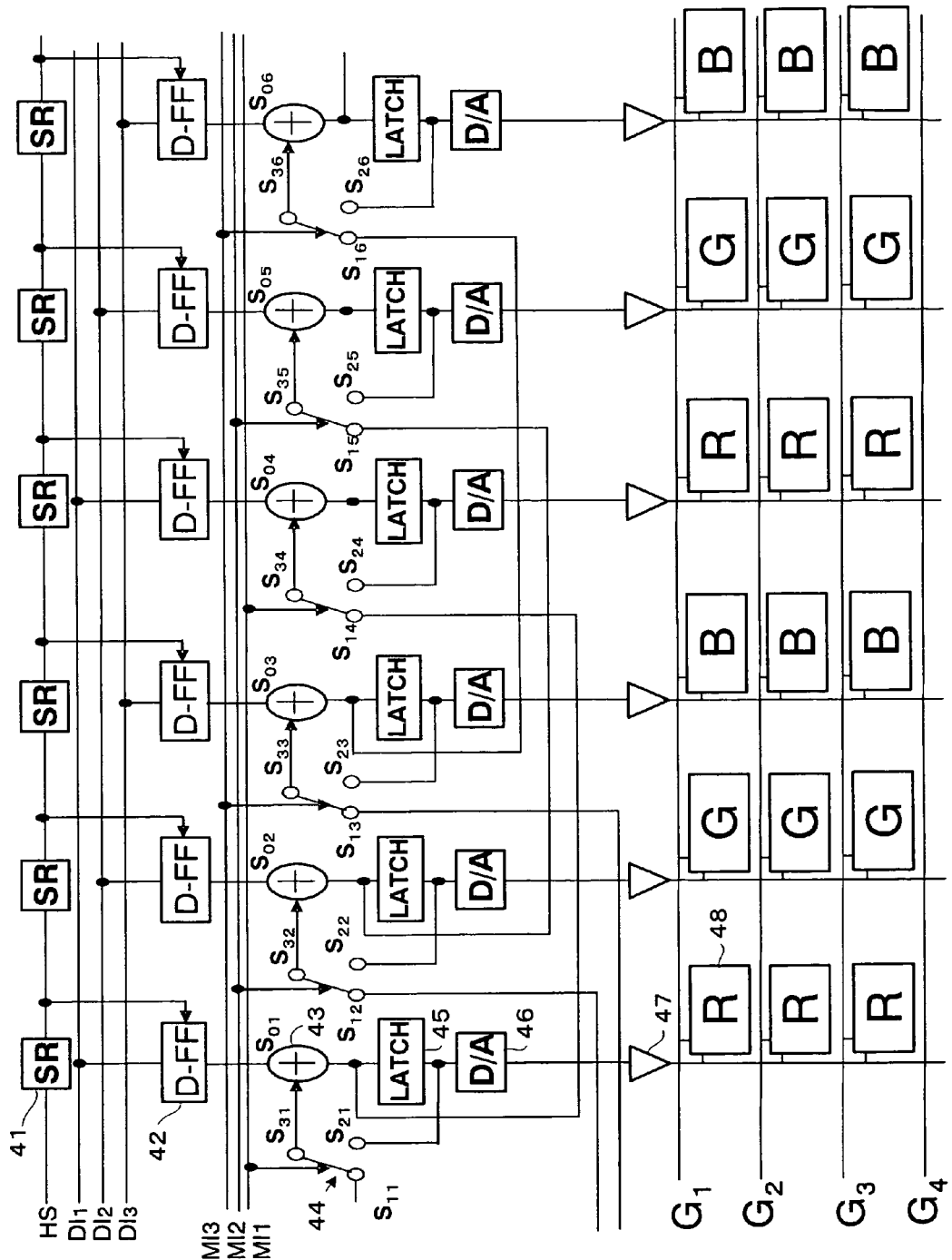
FIG. 11 is a view showing an example of a circuit configuration of the difference data receiving circuit.
Figure 12:
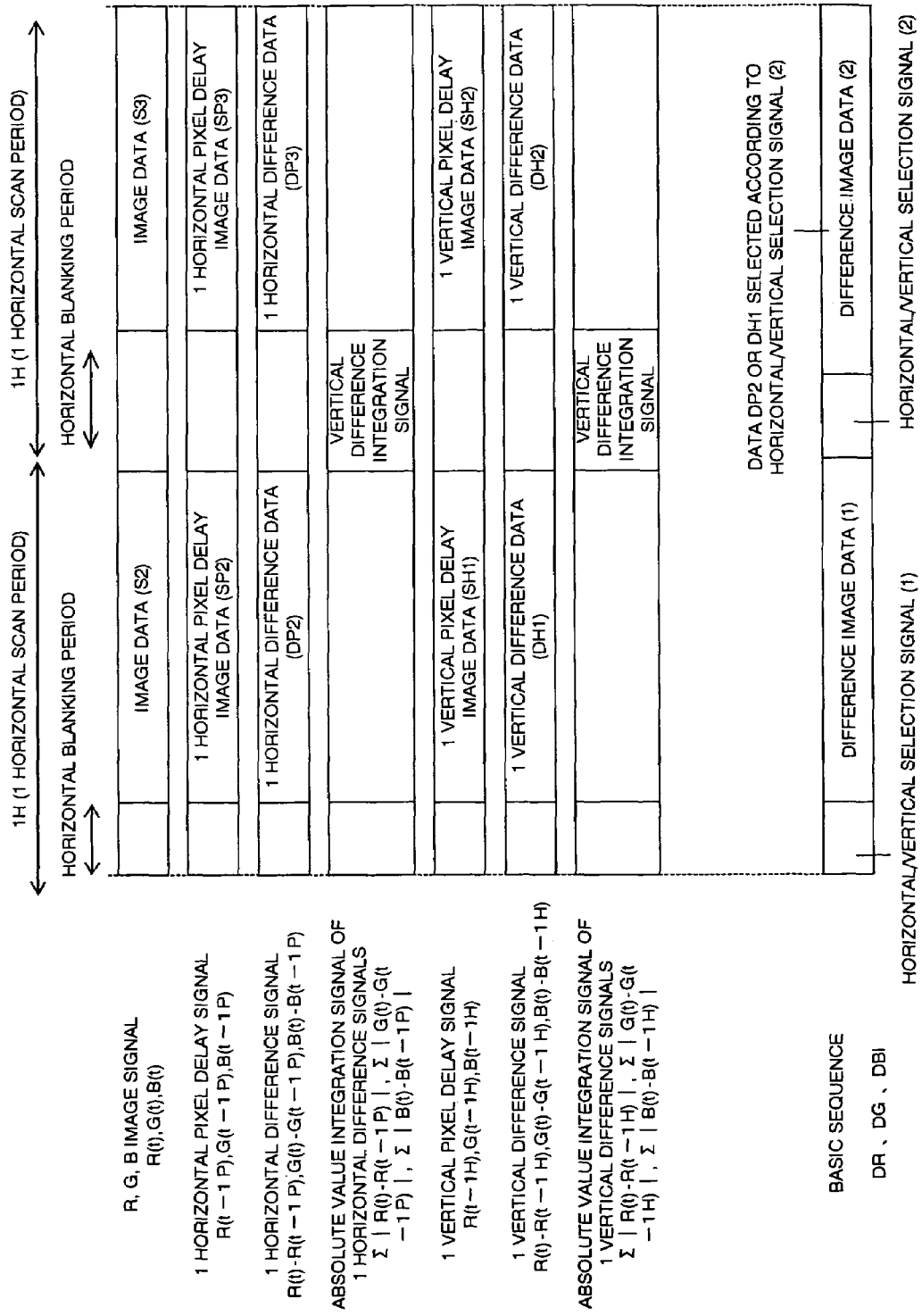
FIG. 12 is a timing chart showing timings of signals in the circuit shown in FIG. 9.
Figure 13:
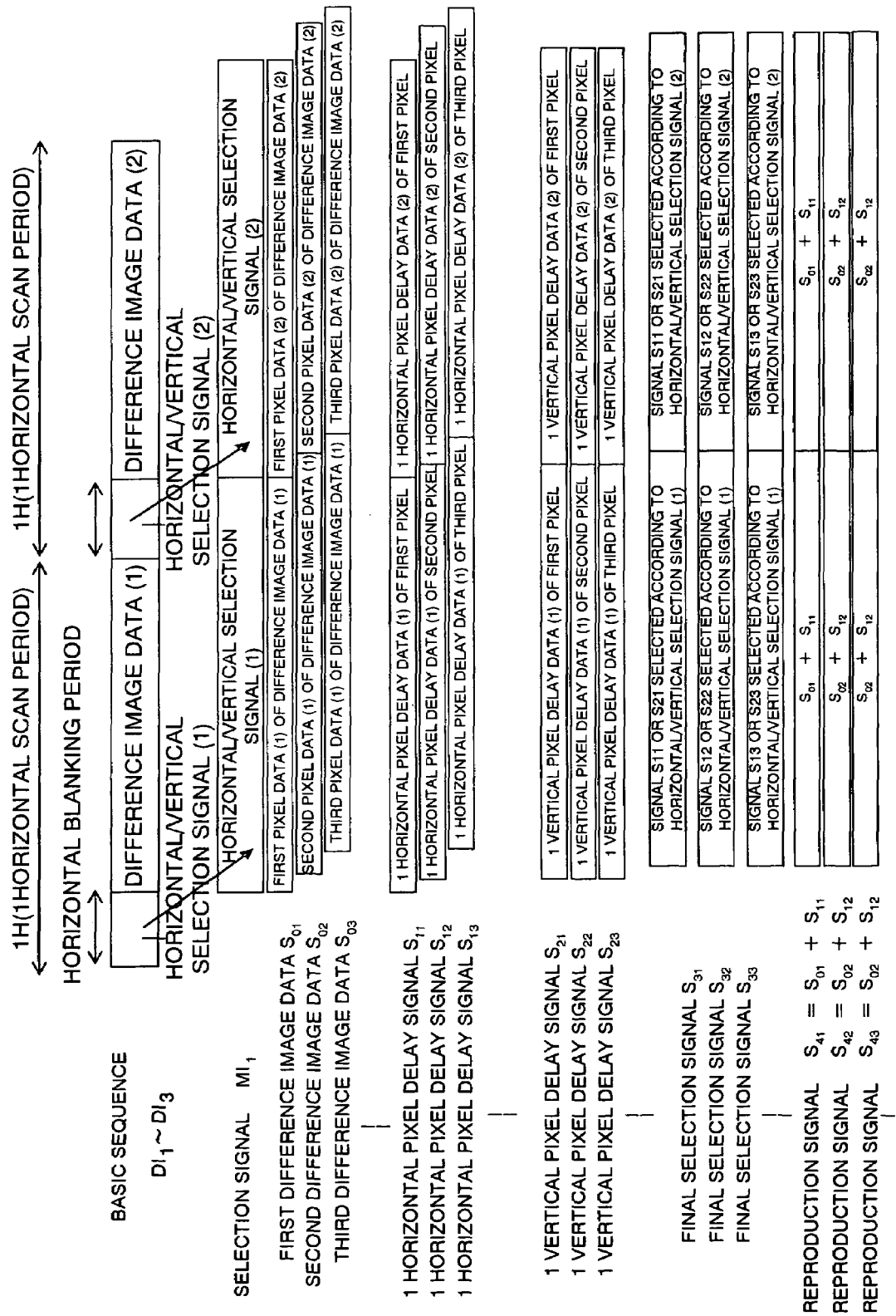
FIG. 13 is a timing chart showing timings of signals in the circuit shown in FIG. 11.
Figure 14:
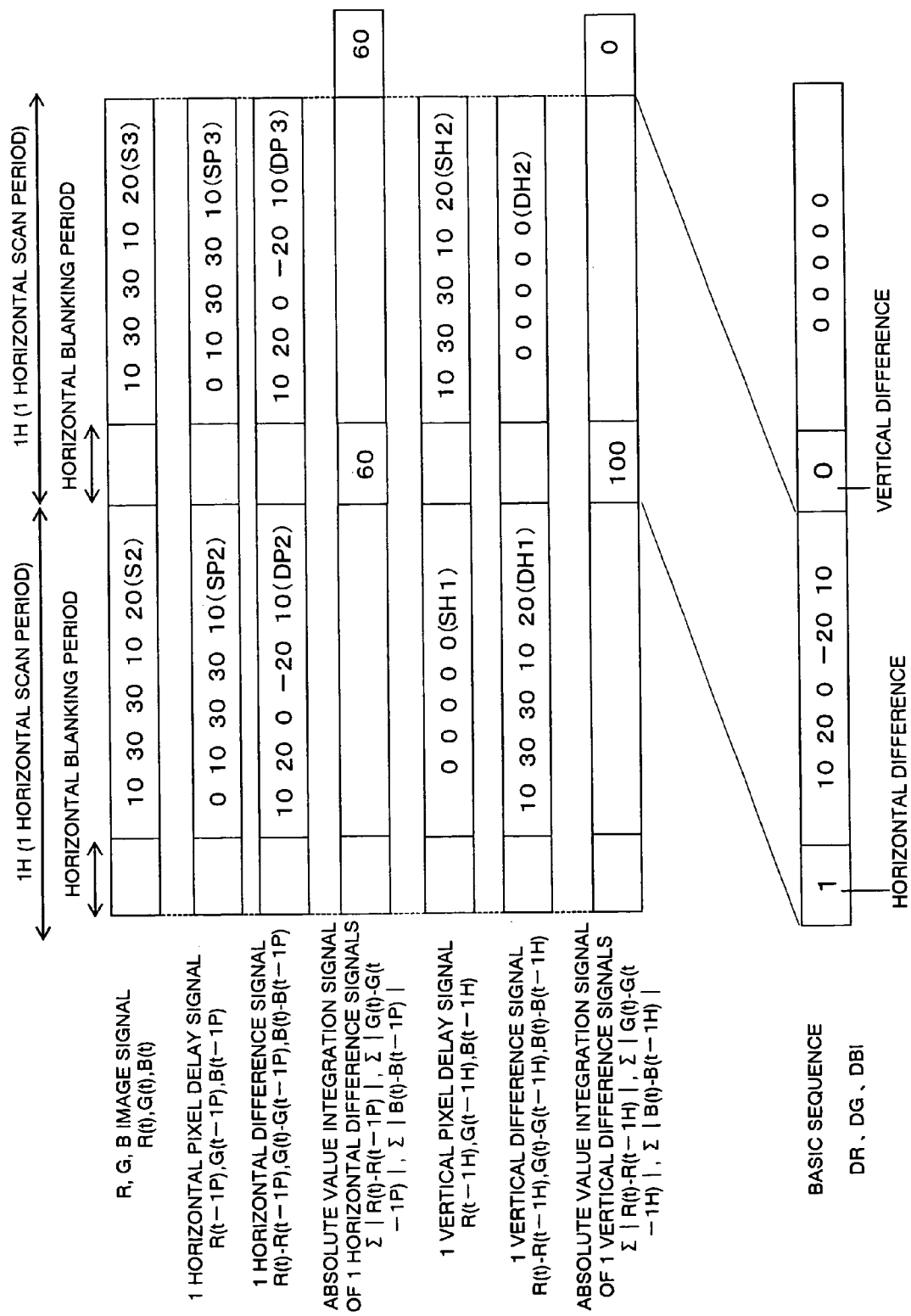
FIG. 14 is a chart showing a concrete example of the signals in the circuit shown in FIG. 9.
Figure 15:
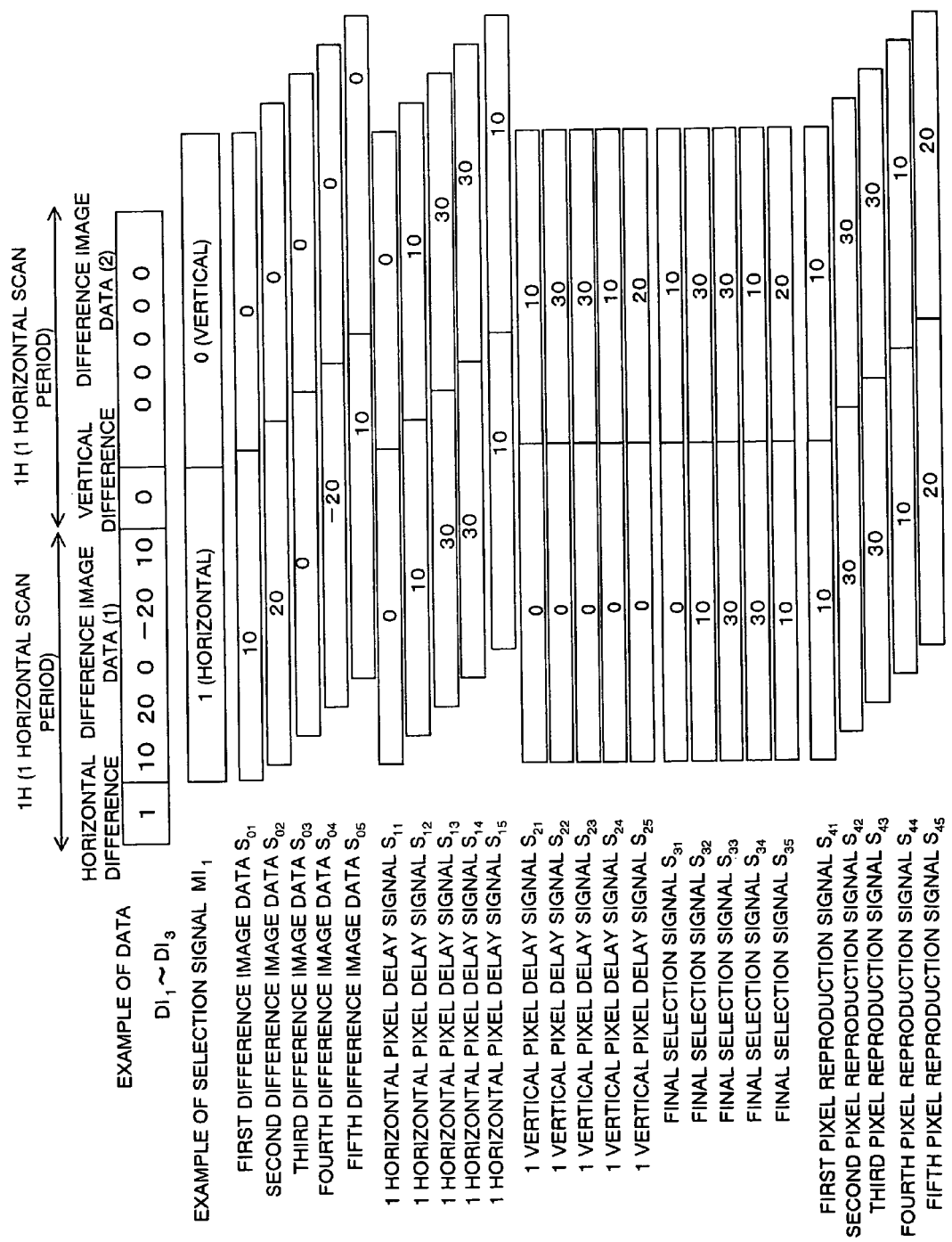
FIG. 15 is a chart showing a concrete example of the signals in the circuit shown in FIG. 11.

Concrete circuit configuration examples of the difference data transmitting circuit 112 and the differential data receiving circuit 121 will be described. FIG. 9 is a view showing an example of a circuit configuration of the difference data transmitting circuit 112, and FIG. 10 is a schematic view showing signals outputted from the circuit in FIG. 9. FIG. 11 is a view showing an example of a circuit configuration of the difference data receiving circuit 121. FIG. 12 and FIG. 13 are timing charts showing timings of signals in the circuits shown in FIG. 9 and FIG. 11 respectively. FIG. 14 and FIG. 15 are views showing concrete examples of the signals in the circuits shown in FIG. 9 and FIG. 11.

In the circuit in FIG. 9, data Dr, Dg, Db respectively corresponding to R, G, and B are inputted to D-flipflops 911 to 913 and outputted in response to a clock signal $CK_1$. As a result, pixel data corresponding to respective pixels are outputted from the D-flipflops 911 to 913. The pixel data outputted from the D-flip-flops 911 to 913 are inputted to delay devices 921 to 923, D-flip-flops 931 to 933, and subtractors 941 to 943. The pixel data inputted to the delay devices 921 to 923 are outputted, being delayed by one scan line period (data are shifted by one line in terms of vertical pixels). Meanwhile, the data inputted to the D-flipflops 931 to 933 are outputted, being delayed by one clock (the data are shifted by one line in terms of horizontal pixels).

Either the data outputted from the delay devices 921 to 923 or the data outputted from the D-flipflops 931 to 933 is selected by switches S1 to S3 to be inputted to the subtractors 941 to 943. That is, either subtraction between vertical pixels or subtraction between horizontal pixels is selected by the operation of the switches S1 to S3. The switches S1 to S3 are controlled by selection signals $M_1$ to $M_3$ outputted from a vertical/horizontal difference integrating circuit 95.

The vertical/horizontal difference integrating circuit 95 receives the data Dr, Dg, Db, performs arithmetic operation to determine which one of the subtraction between the vertical pixels and the subtraction between the horizontal pixels is to be selected, and outputs the selection signals $M_1$ to $M_3$ corresponding to the determination. For each one horizontal line, the vertical/horizontal difference integrating circuit 95 selects, as difference data, a smaller one of absolute values of integrated differences between the vertical pixels and between the horizontal pixels in one line.

The vertical/horizontal difference integrating circuit 95 includes horizontal difference integrating circuits, vertical difference integrating circuits, and comparing circuits, and outputs the comparison results as the selection signals. The horizontal difference integrating circuit converts a difference between the signal delayed by one pixel and the current signal to an absolute value, and thereafter, adds all differences in one line. The vertical difference integrating circuit converts a difference between the signal delayed by one vertical pixel (normally, one horizontal scan period) and the current signal to an absolute value, and thereafter adds all differences in one line. The comparing circuit compares the result of the horizontal difference integration by the horizontal difference integrating circuit and the result of the vertical difference integration by the vertical difference integrating circuit. The vertical/horizontal difference integrating circuit 95 includes three sets of the horizontal difference integrating circuit, the vertical difference integrating circuit, and the comparing circuit, corresponding to RGB, so that the three selection signals $M_1$ to $M_3$ respectively corresponding to RGB are outputted therefrom.

The selection circuit 32 is a circuit selecting and outputting either the selection signals $M_1$ to $M_3$ or the difference data $DI_1$ to $DI_3$. The selection signals $M_1$ to $M_3$ are outputted at the beginning of one horizontal period, and thereafter, the difference data $DI_1$ to $DI_3$ are outputted. As a result, as shown in FIG. 10, the selection signals $M_1$ to $M_3$ are outputted in a blanking period, and the difference data $DI_1$ to $DI_3$ are outputted in a horizontal period after the end of the blanking period. As described above, the circuit in FIG. 9 continuously outputs the selection signals $M_1$ to $M_3$ and the difference data $DI_1$ to $DI_3$.

In the circuit in FIG. 11, a horizontal synchronizing signal HS is retained in a plurality of shift registers 41 and is sent in the right direction of the drawing, so that signals at the timings corresponding to respective pixels 48 are inputted to D-flipflops 42. As a result, the difference data $DI_1$ to $DI_3$ corresponding to respective positions of the pixels 48 are outputted from the D-flipflops 42 (sampling of the difference data).

The difference data $DI_1$ to $DI_3$ outputted from the D-flipflops 42 are inputted to adders 43 and added to previous image data sent through switches 44, so that pixel data are reproduced. The reproduced pixel data pass through latches 45, are D/A converted in D/A converters 46, and are amplified by amplifiers 47 to be inputted to TFTs arranged on the pixels 48. The pixels 48 selected by gate signals G are driven in response to the pixel data. Here, each of the switches 44 outputs, as the previous pixel data, pixel data of a pixel adjacent in a vertical direction or a horizontal direction, according to each of the selection signals $MI_1$ to $MI_3$.

FIG. 12 and FIG. 13 are timing charts showing timings of signals in the circuits shown in FIG. 9 and FIG. 11 respectively, and FIG. 14 and FIG. 15 are concrete examples of these signals respectively.

In FIG. 14, an image signal to be transmitted is a signal of a vertical stripe pattern in which a signal of 10, 30, 30, 10, 20, namely, a signal composed of one horizontal line with five pixels is repeated. In the first line, since an absolute value of a difference between the horizontal pixels (horizontal difference) is smaller than an absolute value of a difference between the vertical pixels (vertical difference), the horizontal difference is selected. In the next line, since an absolute value of a vertical difference is smaller than that of a horizontal difference (signal correlation is higher), the vertical difference is selected, and the selection signal corresponding to this selection result is outputted.

As shown in FIG. 15, the receiving side selects pixels according to this selection signal. As a result, the pixel signal of 10, 30, 30, 10, 20 is reproduced. Incidentally, timings of difference pixel data and pixel delay signals are different depending on each pixel because of the circuit configuration, and do not completely coincide with one another unlike the timings shown in FIG. 5. However, FIG. 13 and FIG. 15 may be considered as being essentially the same as FIG. 5.

Figure 16:
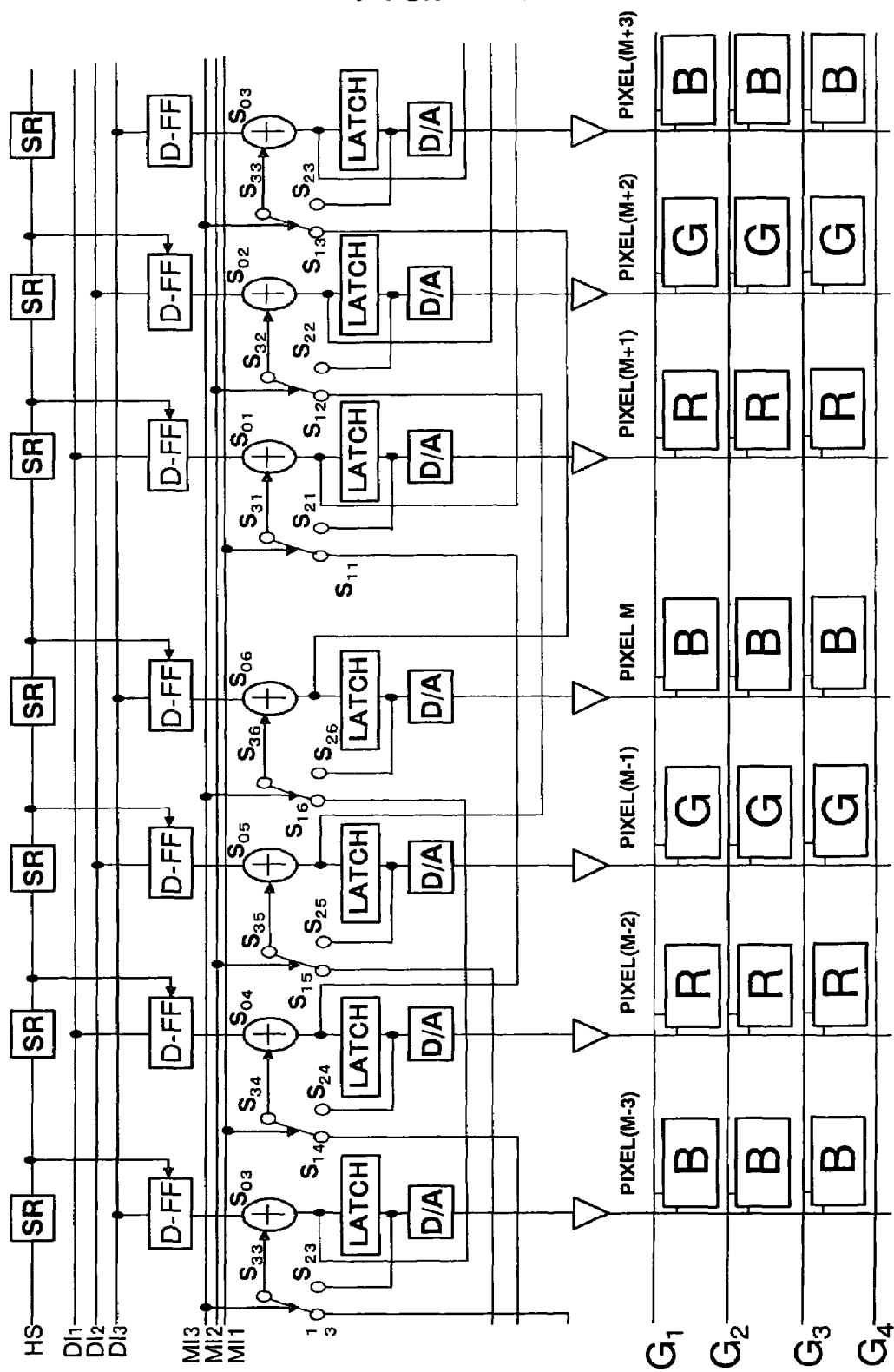
FIG. 16 is a view showing a circuit configuration example in which data are transferred to/from adjacent drivers.

Generally, an image signal of one horizontal line is separated to and driven by a plurality of source drivers. Therefore, it is necessary to transfer the pixel data to/from different drivers. FIG. 16 shows a view showing a circuit configuration example in which data are transferred from an $(N-1)^{th}$ driver to an $N^{th}$ driver which are adjacent to each other. FIG. 16 is not essentially different from FIG. 11 except in that the data are transferred to/from the drivers.

The $(N-1)^{th}$ driver includes pixels (M−3) to M in its final stage, and the $N^{th}$ driver includes pixels (M+1) to (M+3) in its initial stage. Data of the pixels (M−2) to the pixel M are given to the pixels (M+1) to (M+3) respectively. Specifically, three RGB data in the final stage of the $(N-1)^{th}$ driver are given to three RGB pixels in the initial stage of the next $N^{th}$ driver, and are used for addition to the horizontal difference data, so that pixel data is reproduced. Incidentally, as for each of other pixels, data of an adjacent pixel included in the same driver is used to reproduce pixel data for the relevant pixel. Thus directly supplying the pixel data to/from the drivers reduces a need for using a memory for retaining the difference data.

On the other hand, it is also possible that the image signal is separated and each source driver also retains the pixel data of an adjacent source driver. By doing so, the data are redundantly retained by the adjacent drivers, resulting in increase in circuit scale. However, since circuits for driving 240 or 256 or more signal lines are integrated in one driver, the increase in circuit scale is not very significant. In this manner, it is possible to complete image processing in one driver, without reading the pixel data from the adjacent driver, which makes it easy to realize delay control or the like for high-speed synchronization.

CIRCUIT CONFIGURATION EXAMPLE 2

Figure 17:
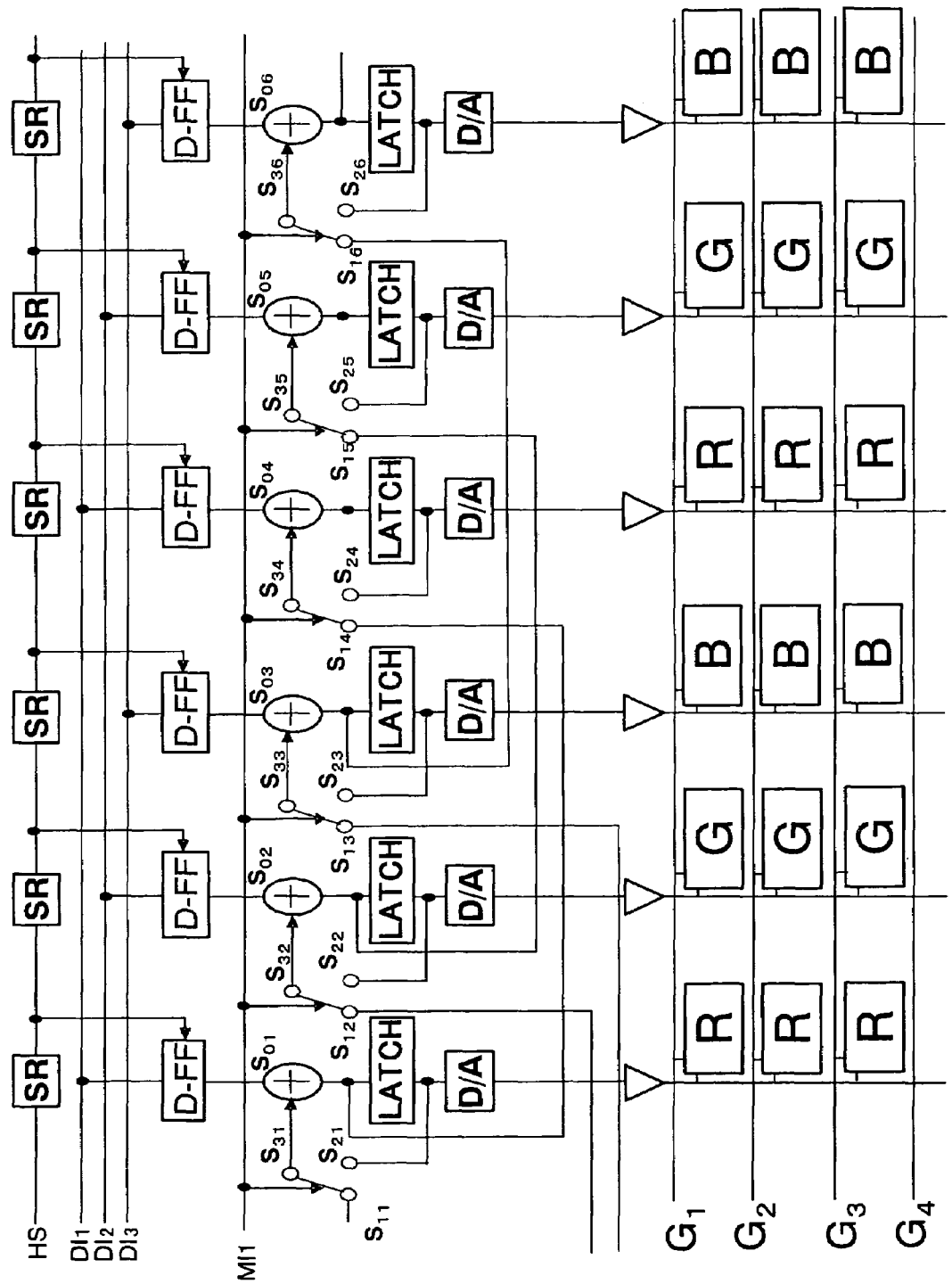
FIG. 17 is a view showing another example of the circuit configuration of the receiving side.
Figure 18:
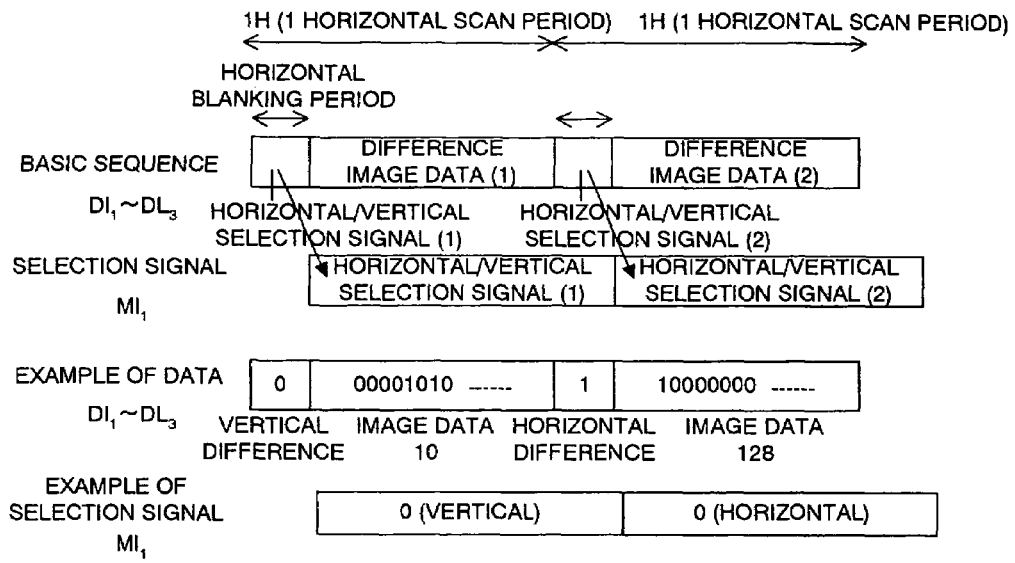
FIG. 18 is a timing chart showing timings of signals in the circuit in FIG. 17.

FIG. 17, which corresponds to FIG. 11, is a view showing another example of the circuit configuration of the receiving side (driver). This drawing is different from FIG. 16 in that each of difference pixel signals $DI_1$, $DI_2$, $DI_3$ corresponds to serial RGB signals, and as a result, a selection signal is only $MI_1$. FIG. 18 is a timing chart showing timings of signals in the circuit in FIG. 17.

The inputted difference pixel signals $DI_1$, $DI_2$, $DI_3$ are sampled according to respective pixel positions and converted to parallel difference pixel signals. Thereafter, adding circuits add the difference pixel data and previous pixel data to generate pixel data. As the previous pixel data, used are pixel data with higher correlation, in a signal delayed by one pixel in a horizontal direction or a vertical direction. The reproduced pixel data are D/A converted and transmitted to respective pixels through signal lines of a display device to be used for display. These operations are not essentially different from those in the case in FIG. 11 except that the selection signal is only $MI_1$.

CIRCUIT CONFIGURATION EXAMPLE 3

Figure 19:
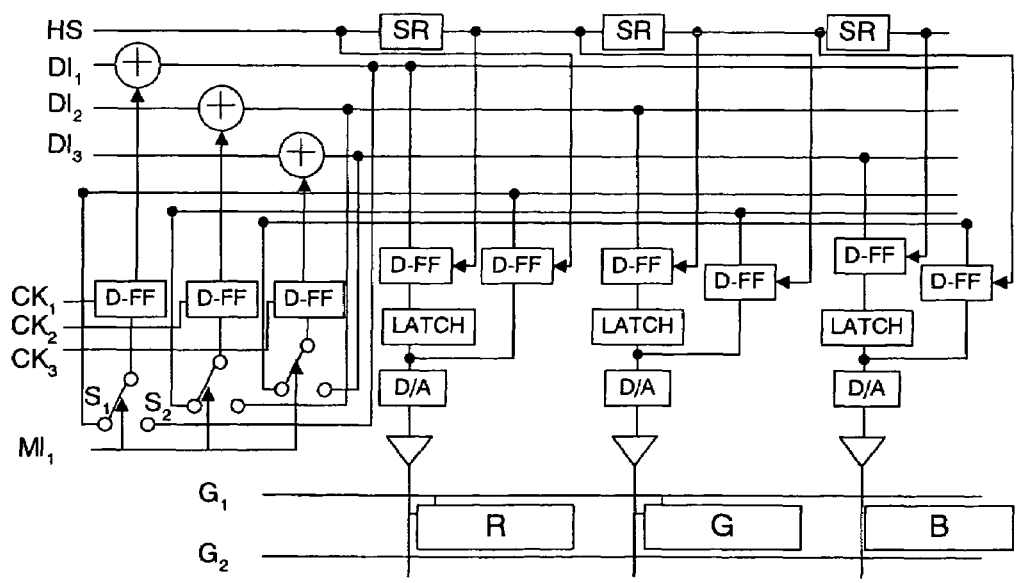
FIG. 19 is a view showing still another example of the circuit configuration of the receiving side.

FIG. 19, which corresponds to FIG. 11, is a view showing another example of the circuit configuration of the receiving side (driver). Here, difference data and previous pixel data kept as serial data are added to thereby reproduce pixel data. This can reduce the number of adders but requires signal lines allowing access to once retained data. A driving capacity of the signal lines tends to become large since one third of buffers are connected to the signal lines out of outputs of the driver. Due to this capacity and serial data read, power consumption tends to be large. Further, since these signal lines are driven at high speed, a resistance thereof needs to be small and they require a large space in an IC, which tends to lead to an increase in chip area.

COMPARISON OF CIRCUIT CONFIGURATION EXAMPLES 1 TO 3

The whole circuit scale of the circuit configuration examples 1, 2 can be relatively easily reduced, compared with that of the circuit configuration example 3. This is because of the following reasons.

(1) Each buffer driving each signal line has one adding circuit.
(2) Adjacent pixel data can be acquired from an adjacent circuit relatively easily.
(3) Further, a digital circuit can be greatly reduced in size owing to its highly advanced miniaturization technology.

Hereinafter, this will be described semiquantitatively.

As constituent elements of a driver, buffers, A/D converters, latches (including D-FFs), signal lines can be named. At this time, an occupying area ratio of these constituent elements in the driver is expressed by the following expression, where Rb is an area ratio of the buffers, Ra is an area ratio of the A/D converters, Rr is an area ratio of the latches (including the D-FFS), and R1 is an area ratio of the signal line wiring.

$$Rb:Ra:Rr:R1 = 4:2:1:1 \qquad \text{Expression (1)}$$

Here, one of the reasons why the area ratio Rb of the buffers and the area ratio Ra of the A/D converters are larger than the area ratio Rr of the latches (including the D-FFs) is that the buffers and the A/D converters have relatively high withstand voltage and the latches have relatively low withstand voltage.

In the circuit configuration example 3 of the driver, the increase in the wiring and the latches results in 2/8 increase as the ratio. On the other hand, in the circuit configuration example 1 of the driver, only the area ratio of the low-withstand voltage adders (including the switches and the D-FFS) is increased. Therefore, only an area scale of about the same order of that of the latches is necessary, so that the increase of the ratio can be suppressed to about 1/8 increase.

Generally, power consumption P of a driver is expressed by the following expression (2).

$$P = C \cdot f \cdot V^2 \qquad \text{Expression (2)}$$

In the case of the circuit configuration example 3 of the driver, power consumption P2 is expressed by the following expression (3), where Cs is a capacity of the signal lines.

$$P3 = Cs \cdot f \cdot V^2 \qquad \text{Expression (3)}$$

In the circuit configuration example 1 of the driver, power consumption P1 is expressed by the following expression (4), where Cadd is a capacity of the adders and the latches.

$$P1 = Cadd \cdot f \cdot N \cdot V^2 \qquad \text{Expression (4)}$$

Here, N is the number of pixel lines.

The circuit configuration examples 1, 3 of the driver are equal in voltage and frequency, but a capacity of the signal lines and a capacity per one stage of the latches are different by about 100 times. Therefore, power consumption in driving the signal lines is larger by about 100 times.

Second Embodiment

As described above, in FIG. 9 and FIG. 11, the vertical differences and horizontal differences in one line are all calculated in advance, and a smaller difference is selected. A possible alternative way may be to select one with a smaller number of changes in the difference. In FIG. 9 and FIG. 11, the selection signals are transmitted in the horizontal blanking period, but a possible alternative way is to transmit the selection signals in a vertical blanking period. Another alternative way may be to apply different selection methods from pixel to pixel. For example, based on the results of the vertical difference and the horizontal difference in a decoded signal of a previous pixel, a smaller one can be determined as a selection method for a next pixel. In this selection method, the transmission of information (signal) indicating the selection method is not necessary.

Figure 20:
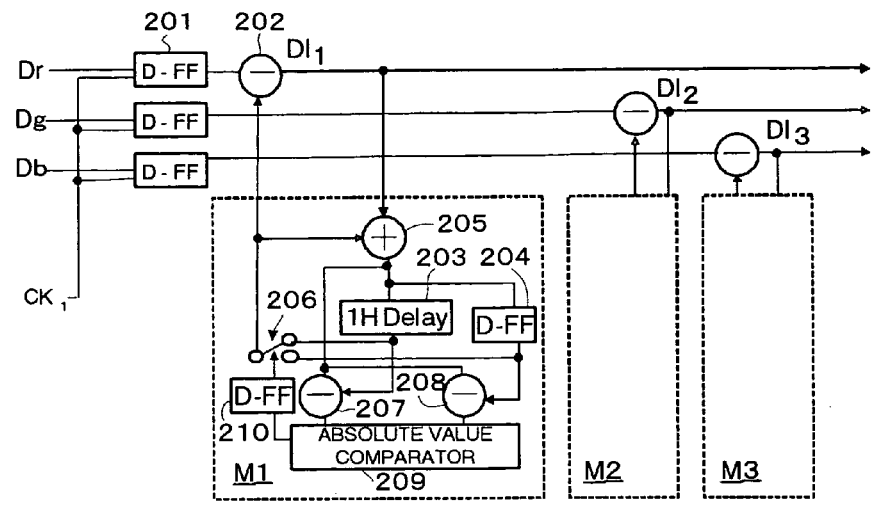
FIG. 20 is a view showing a circuit configuration of a difference data transmitting circuit according to a second embodiment.
Figure 21:
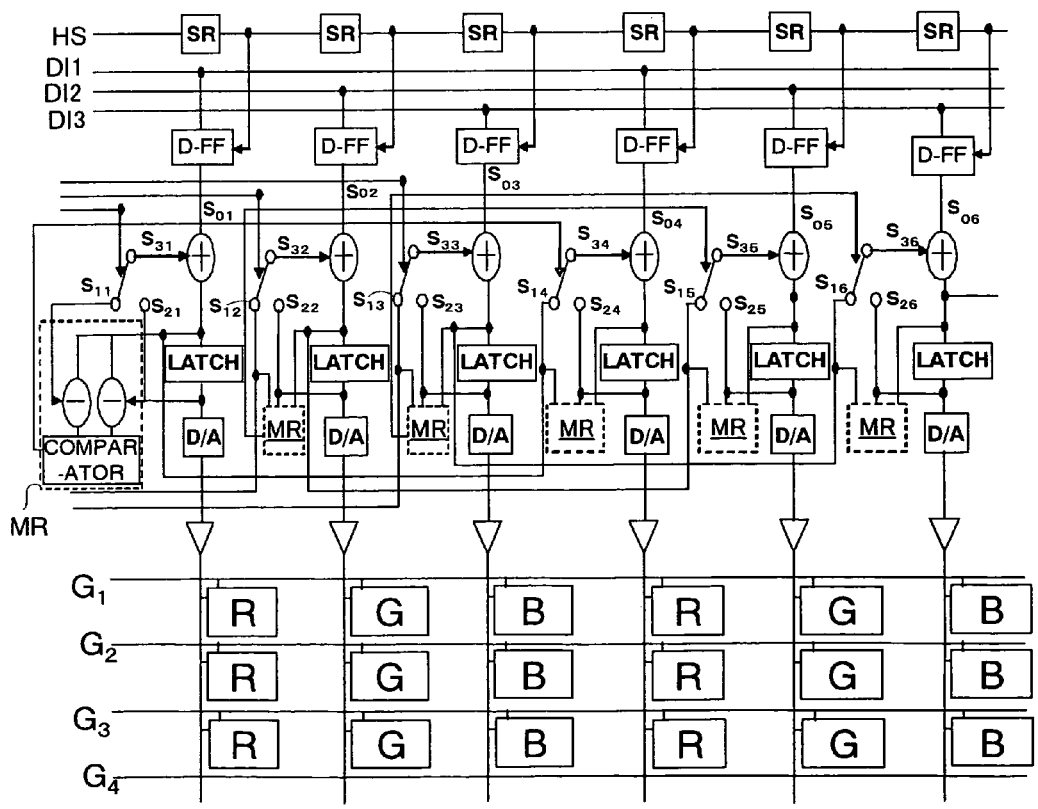
FIG. 21 is a view showing a circuit configuration of a difference data receiving circuit according to the second embodiment.

FIG. 20 and FIG. 21 are views showing circuit configurations of a difference data transmitting circuit 112 and a difference data receiving circuit 121 according to a second embodiment, respectively.

In the first embodiment, the signals for selecting the horizontal difference or the vertical difference are transmitted for each line. In this method, (1) the number of added bits increases and (2) pixel-by-pixel optimization is difficult.

This embodiment utilizes the fact that an ambient state of a signal of a previous pixel is similar to an ambient state of a next pixel. Specifically, a horizontal difference and a vertical difference in an already reproduced signal of the previous pixel are calculated, and a smaller difference is determined as the selection method for the next pixel. This eliminates a need for the transmission of a selection signal. Further, since the receiving side generates a horizontal/vertical selection signal for each pixel, pixel-by-pixel optimization is possible.

As shown in FIG. 20, the transmitting side includes D-flipflops 201, subtractors 202, and decoding circuits M1 to M3. Note that an internal configuration of the decoding circuits M2, M3, though not shown, is the same as that of the decoding circuit M1.

The subtractors 202 subtract previous pixel data from pixel data to generate difference pixel signals $DI_1$ to $DI_3$. At this time, horizontal period delay circuits 203 and D-flipflops 204 delay the pixel data. Adders 205 add the difference pixel signals $DI_1$ to $DI_3$ and the previous pixel data (vertical pixel delay data, horizontal pixel delay data) selected by switches 206 to reproduce the pixel signal. Note that the result of the determination in the pixel data of the previous pixel can be adopted for this selection.

The vertical difference and the horizontal difference are calculated based on the reproduced pixel signals, and comparators 209 compare absolute values thereof to select smaller absolute values, and selection signals $M_1$ to $M_3$ corresponding to this selection result are generated and outputted. Further, the switches 206 are operated according to the selection signals $M_1$ to $M_3$, so that the subtractors 202 continuously generate the difference pixel signals $DI_1$ to $DI_3$. In this manner, using the results of the arithmetic operation in the pixel data of the previous pixel, the vertical difference/the horizontal difference is continuously selected and the difference pixel signals $DI_1$ to $DI_3$ are continuously generated.

As shown in FIG. 21, the receiving side includes selection signal reproducing units MR, and reproduces the selection signals. As in the transmitting side, each of the selection signal-reproducing units MR calculates reproduced horizontal and vertical differences from the reproduced signal of the previous pixel, and the comparators compare these differences to reproduce the selection signals. Based on the selection signals outputted from the comparators of the selection signal-reproducing units MR, switches are operated and the next pixel data are reproduced. Incidentally, FIG. 21 shows the internal configuration of only the left-end selection signal-reproducing unit MR, but the other selection signal-reproducing units MR also have the same internal configuration. Further, wiring from the selection signal-reproducing units MR on and after the fourth stage from the left is not shown in the drawing.

Figure 22:
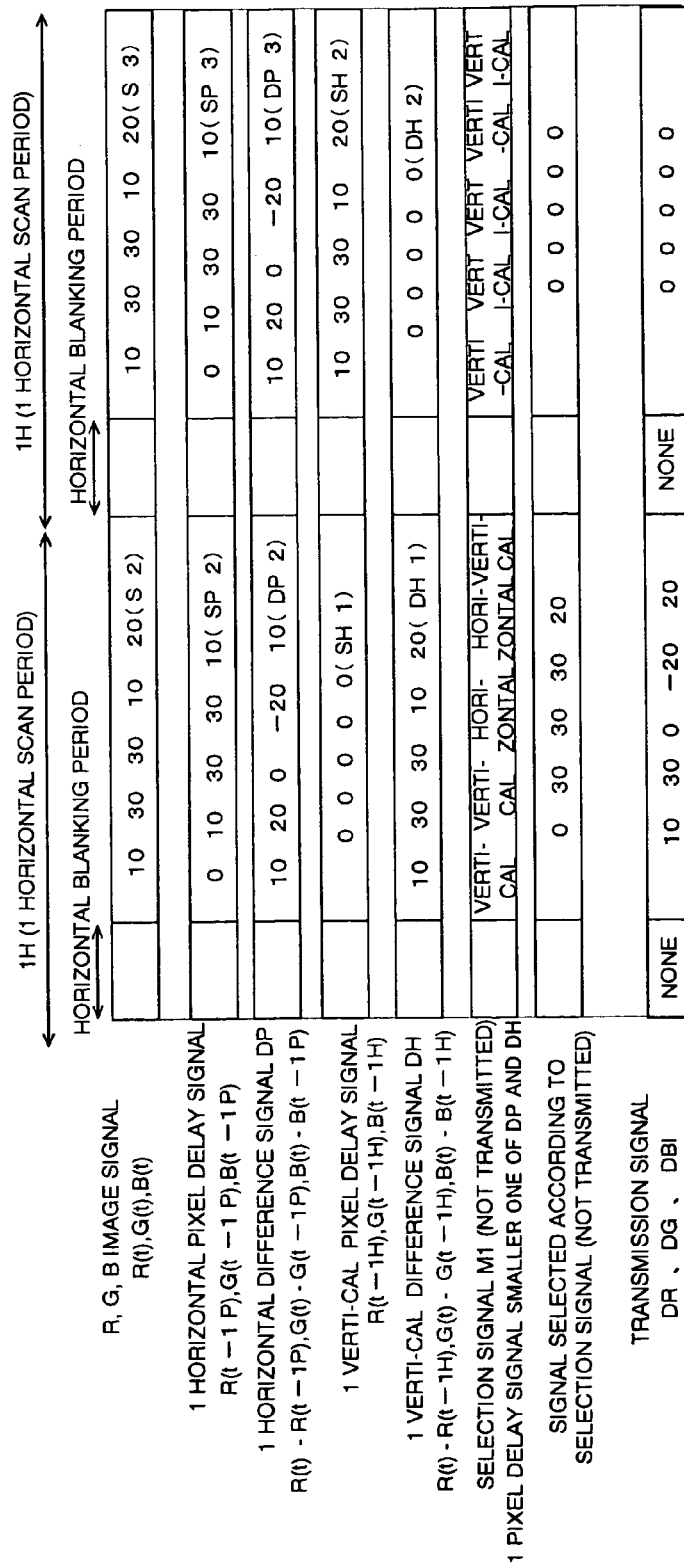
FIG. 22 is a timing chart showing an example of signals in the transmitting side.
Figure 23:
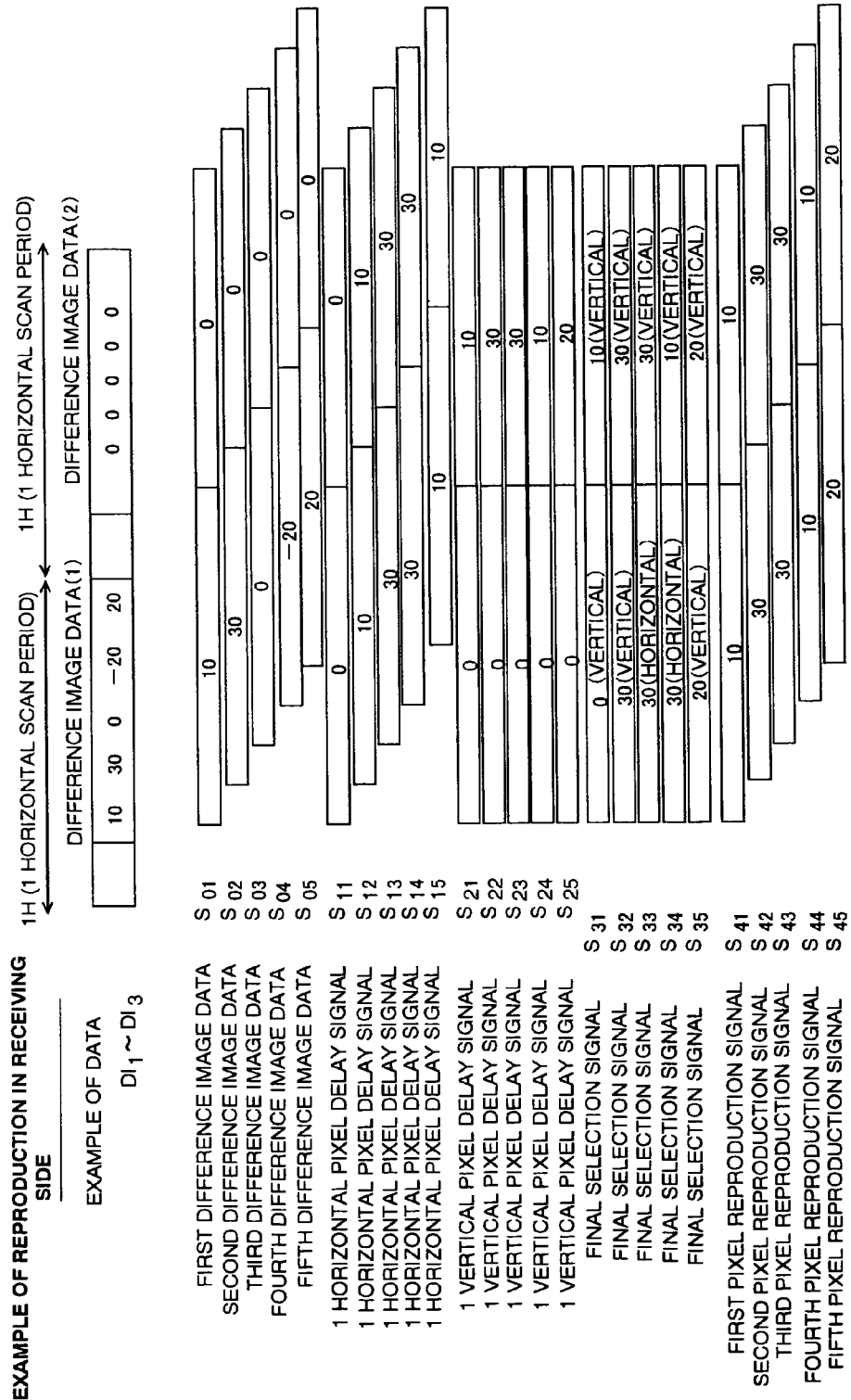
FIG. 23 is a timing chart showing an example of signals in the receiving side.

FIG. 22 and FIG. 23 are timing charts showing examples of signals in the transmitting side and the receiving side respectively. It is assumed here that, in an image signal, one horizontal line has five pixels, which correspond to data with values 10, 30, 30, 10, 20. From the image signal, a signal delayed by one pixel and a difference thereof (horizontal difference), and a signal delayed by one vertical pixel and a difference thereof (vertical difference) are generated. As a result of the comparison between the horizontal difference and the vertical difference, the selection of the vertical difference for the first pixel, the vertical difference for the second pixel, the horizontal difference for the third pixel, the horizontal difference for the fourth pixel, and the vertical difference for the fifth pixel are determined. Using thus selected signals; an ultimate difference is calculated and transmitted.

As shown in FIG. 23, the receiving side generates the selection signals as in the transmitting side, and adds the difference data and the horizontal/vertical pixel delay data which are selected according to the selection signals, so that pixel data are reproduced. The transmitting side and the receiving side both perform the same processing, so that the selection signals in the both are the same. As a result, it is possible to reproduce the pixel data without transmitting the selection signals.

Third Embodiment

Figure 24:
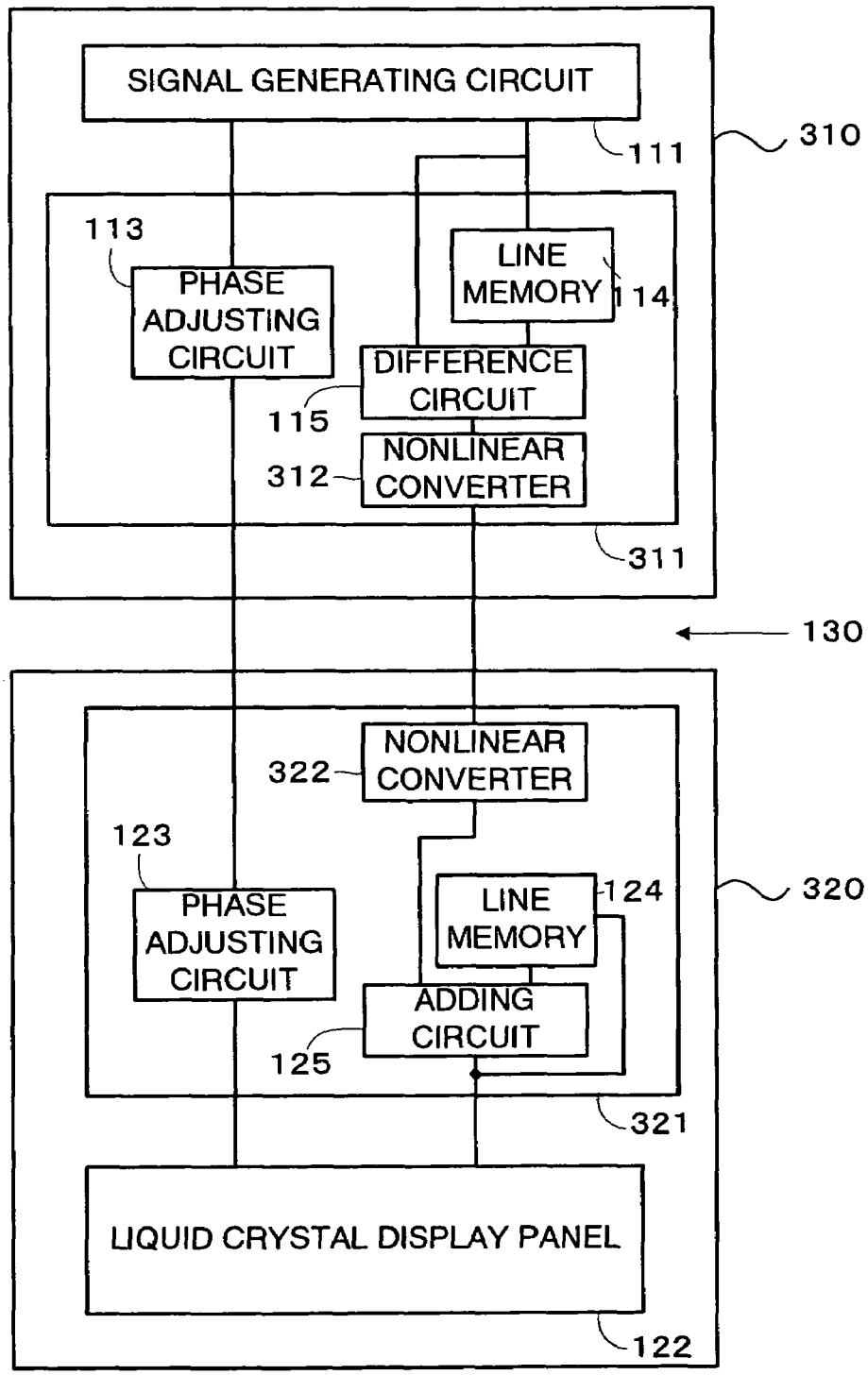
FIG. 24 is a block diagram showing a display system according to a third embodiment of the present invention.

FIG. 24, which corresponds to FIG. 1, is a block diagram showing a display system 300 according to a third embodiment of the present invention. This embodiment lessens a change in transmitted signals, and by utilizing this, the number of the transmitted signals, that is, the number of bits is reduced. As a result, it becomes possible to reduce power consumption and narrow a frame of a display.

As shown in FIG. 24, a difference signal generated by a difference circuit 115 is nonlinearly converted by a nonlinear converter 312, and for example, the number of bits is reduced from 9 bits to 5 bits. The number of bits of each signal is, for example, 8 bits for each of RGB, which means totally 24 signal lines are necessary. A width of a PCB (Printed Circuit Board) is substantially determined by the number of the signal lines. Therefore, the reduction in the number of bits of each signal results in narrowing an area of the frame of a display device 120, that is, an area corresponding to a size of a panel module including the PCB from which a screen display unit is excluded. As a result, even with the same module size, a larger screen can be realized.

Figure 25:
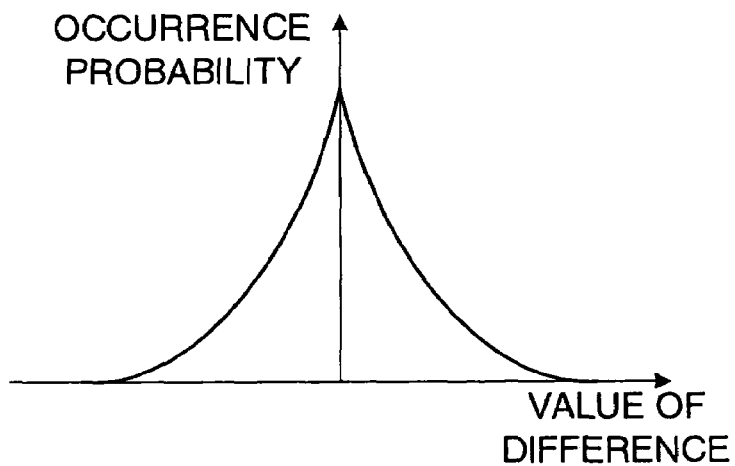
FIG. 25 is a graph showing the relation between a value of vertical difference pixel data and an occurrence probability thereof.

FIG. 25 is a graph showing the relation between a value of a vertical difference pixel data and its occurrence probability (statistical occurrence frequency of the vertical difference signal). Differences in a vertical direction present Laplace distribution expressed by the following expression (10) as shown in FIG. 25 since a typical image has a high vertical correlation.

$$P(\epsilon)=1/(2^{1/2}*\sigma)\cdot\exp(-2^{1/2}*|\epsilon|/\sigma) \qquad \text{Expression (10)}$$

Here, $\sigma^2$ is a variance of the difference signal and corresponds to average power.

As shown in FIG. 25 and the expression (10), in the typical image, an occurrence probability of a signal whose difference value is 0 (zero) (the same signal and a signal that does not have to be sent after being sent once) is high. Therefore, according to this probability, nonlinear conversion is performed in which each level having a high occurrence probability is converted to one code, while a plurality of levels having a low occurrence probability are converted to the same code.

Figure 26:
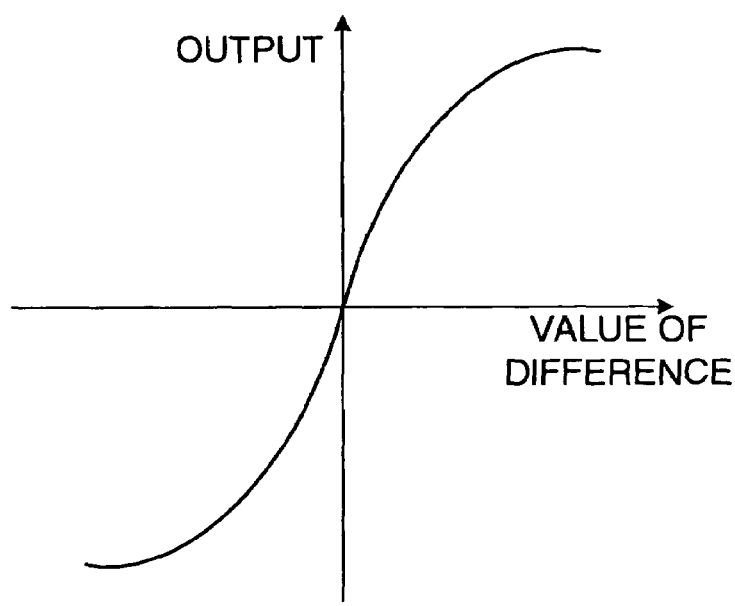
FIG. 26 is a graph showing the relation of difference data before and after conversion.

FIG. 26 is a graph showing an example of the relation of difference data before and after conversion. In this example, an output is 5 bits, namely, 32 levels, while a difference signal is 9 bits, namely, 512 levels. Several larger differences are collectively converted to the same number, for example, as follows: "0" and "1" are converted to "0" and "1" respectively; but "2" and "3" are converted to "2"; and "4", "5", and "6" are converted to "3". As a result, it is possible to reduce the number of transmitted bits as a whole to narrow the width of the PCB (frame).

In this conversion, it is possible to determine a conversion table based on the occurrence possibility, resulting in less deterioration of image quality. If deterioration of image quality is large, periods during which separated 9 bits are accurately sent by two processes are inserted in the middle of a screen, which can prevent the deterioration. Further, changing the timing thereof field by field to move the position of the deterioration is also applicable for making the deterioration not easily visible.

CIRCUIT CONFIGURATION EXAMPLE 1

Figure 27:
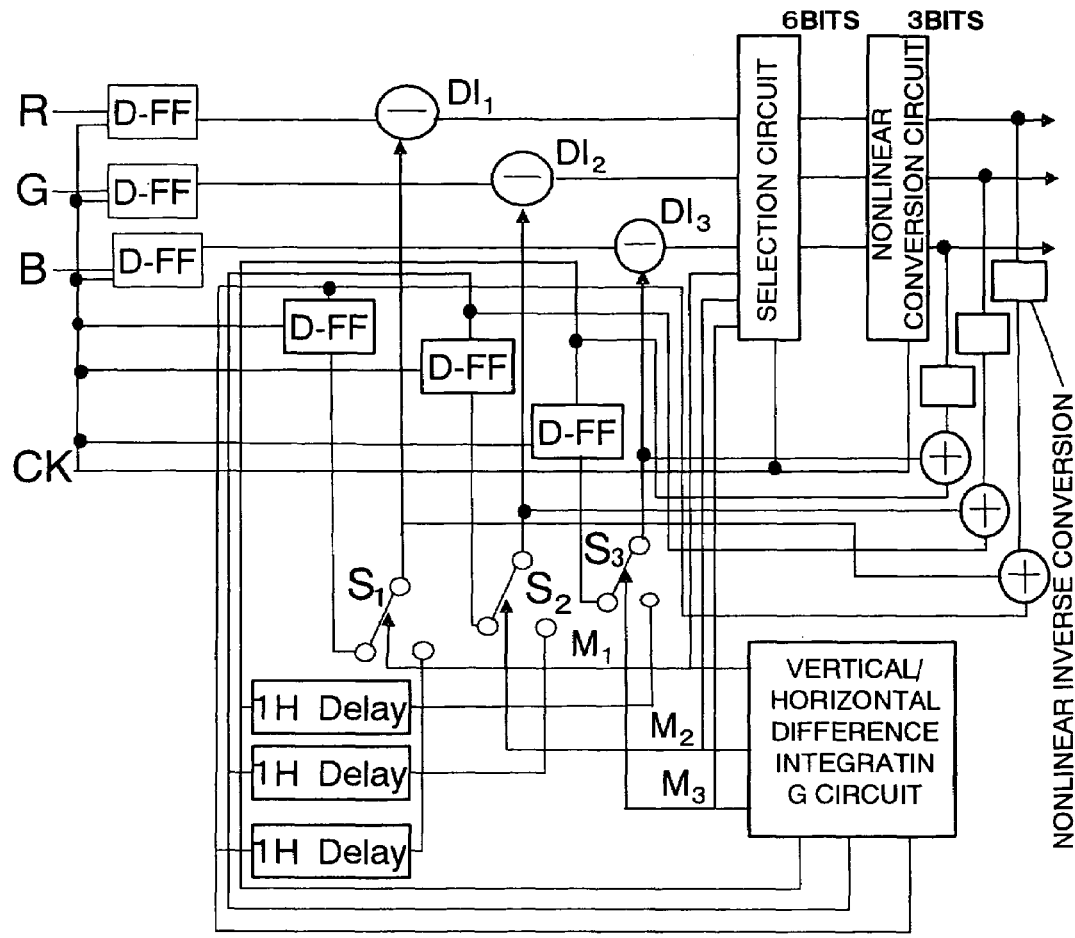
FIG. 27 is a circuit diagram showing a circuit configuration example of a transmitting side.
Figure 28:
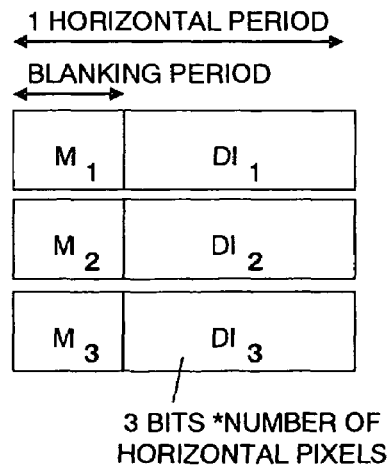
FIG. 28 is a schematic view showing signals transmitted from the circuit in FIG. 27.
Figure 29:
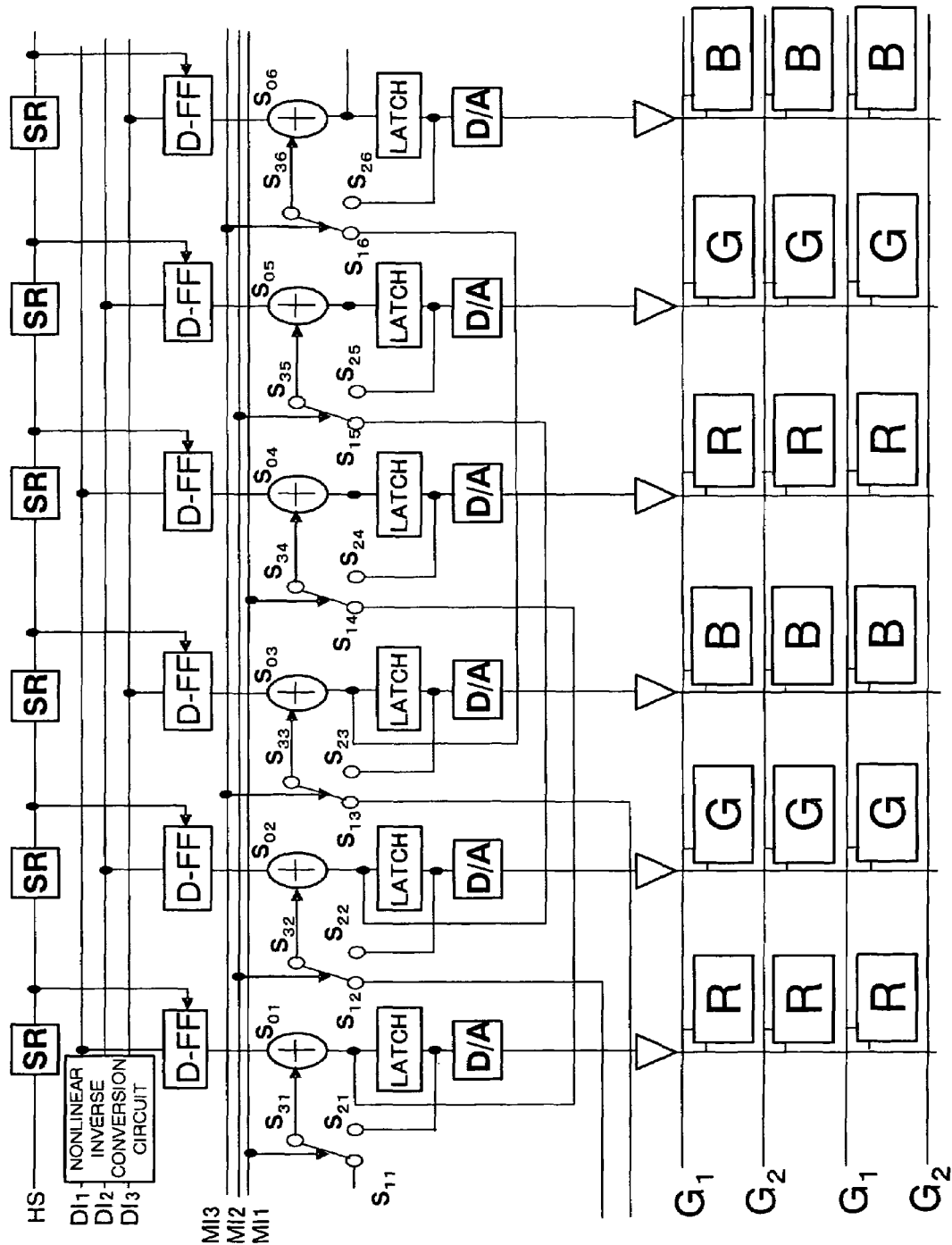
FIG. 29 is a circuit diagram showing a circuit configuration example of a receiving side.

A circuit configuration example of the nonlinear conversion will be shown. FIG. 27 is a circuit diagram showing a circuit configuration example of a transmitting side. FIG. 28 is a schematic view showing difference signals transmitted from the circuit in FIG. 27. Further, FIG. 29 is a circuit diagram showing a circuit configuration example of a receiving side. FIG. 30 is a schematic view showing a concrete example of a nonlinear conversion table. Here, an example of conversion from 5 bits to 3 bits is shown. It is seen that in this table, smaller values are more accurately reproduced, utilizing the fact that difference data concentrate near 0 (zero) due to high correlation with an adjacent pixel.

As shown in FIG. 27, the difference signals outputted from a selection circuit are inputted to a nonlinear conversion circuit, which nonlinearly converts the difference signals, thereby reducing the number of bits. As shown in "after conversion" in FIG. 30, the nonlinear conversion circuit uses a nonlinear conversion technique (signals with "0", "1", and "2" where the difference signals concentrate remain to have "0", "1", and "2" even after the conversion, and several levels of the other signals are converted to the same level so as to fall within 3 bits, namely, "0" to "7"), thereby transmitting the difference signals with lowered bit accuracy. Therefore, the signals with lowered bit accuracy include errors of 1 to 5 levels even after being reproduced. Here, the deterioration degree of image quality is small because of the following reasons (1) and (2). That is: (1) an occurrence probability of a large difference is low; and (2) when the difference is large, a change of an image signal is large, so that an error is not easily visible. When deterioration of image quality in the conversion as shown in FIG. 30 was actually confirmed, 30 dB or higher was obtained as an S/N ratio, though depending on the image, and little deterioration was observed.

Assuming that an ideal table of this nonlinear conversion is defined as T(X), its inverse conversion is defined as $T^{-1}$, an occurrence probability of a difference value X is defined as P(X), and its error is defined as $E(X)(=X-T^{-1}(T(X)))$, T(X) is preferably selected so that an evaluation value V $(=\Sigma E(X)P(X))$ becomes the minimum.

As shown in FIG. 29, the receiving side is configured such that pixel signals are reproduced after a nonlinear inverse conversion circuit performs nonlinear inverse conversion. The other configuration is the same as that in FIG. 11, and therefore, description thereof will be omitted here.

CIRCUIT CONFIGURATION EXAMPLE 2

Figure 31:
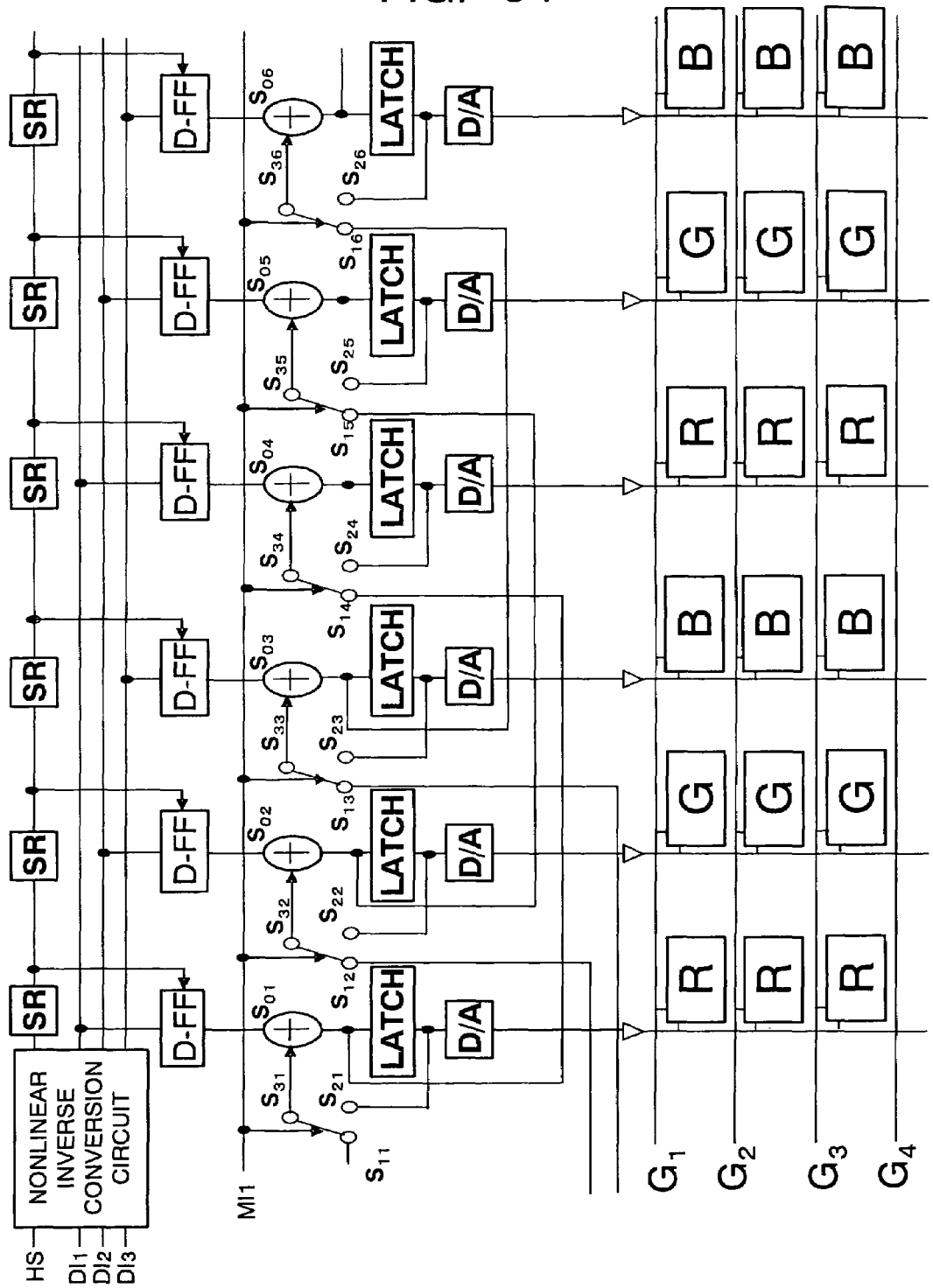
FIG. 31 is a circuit diagram showing another circuit configuration example of the receiving side.

FIG. 31 is a circuit diagram showing another circuit configuration example of the receiving side. The circuit shown in this drawing is configured such that a nonlinear inverse conversion circuit is added to the circuit shown in FIG. 17. The other configuration is the same as that in FIG. 17, and therefore, detailed description thereof will be omitted.

Fourth Embodiment

A fourth embodiment of the present invention will be described. In the third embodiment, the difference signal whose number of bits is reduced by the nonlinear conversion includes an error. Therefore, an ultimate decoded image signal resulting from the addition has a level equal to or higher than a predetermined level, which may possibly lead to a malfunction. This embodiment can prevent such a malfunction.

Figure 32A:
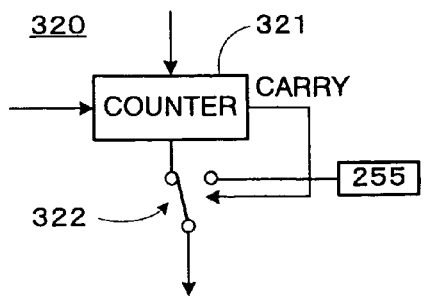
FIG. 32A and FIG. 32B are views showing an adder according to a fourth embodiment of the present invention and a typical adder, respectively.
Figure 32B:
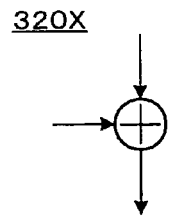

FIG. 32A and FIG. 32B are views showing an adder 320 according to the fourth embodiment of the present invention and a typical adder 320X, in contrast. Using this adder 320 instead of the typical adder 320X as each of the adders shown in FIG. 29 makes it possible to limit a value of difference data after nonlinear inverse conversion.

In the circuit configuration in FIG. 29, when the value of image data changes from 10 to 250, an accurate value of difference data is 240. At this time, the difference data is nonlinearly converted for the purpose of reducing the number of bits, so that the value of the difference data after decoding (after nonlinear inverse conversion) becomes 248. The typical adder 320X adds 10 to this 248, resulting in 258, which does not fall within 255, that is, an 8-bit limit. Meanwhile, a carry occurs in a counter 321 if a value of the addition result exceeds 255 when a counting range is 8 bits. A switch 322 is changed when this carry occurs, so that a fixed value 255 is outputted instead of the addition value. In other words, an upper limit is set (a limiter is set) on the output. This can prevent the reproduction of an erroneous signal caused by the carry beyond a dynamic range.

Fifth Embodiment

A fifth embodiment of the present invention will be described. In this embodiment, two nonlinearly converted pixel data are transmitted together. Since power consumption is proportional to frequency, transmitting two pixels together after reducing the number of bits by nonlinear conversion makes it possible to reduce frequency.

Figure 33:
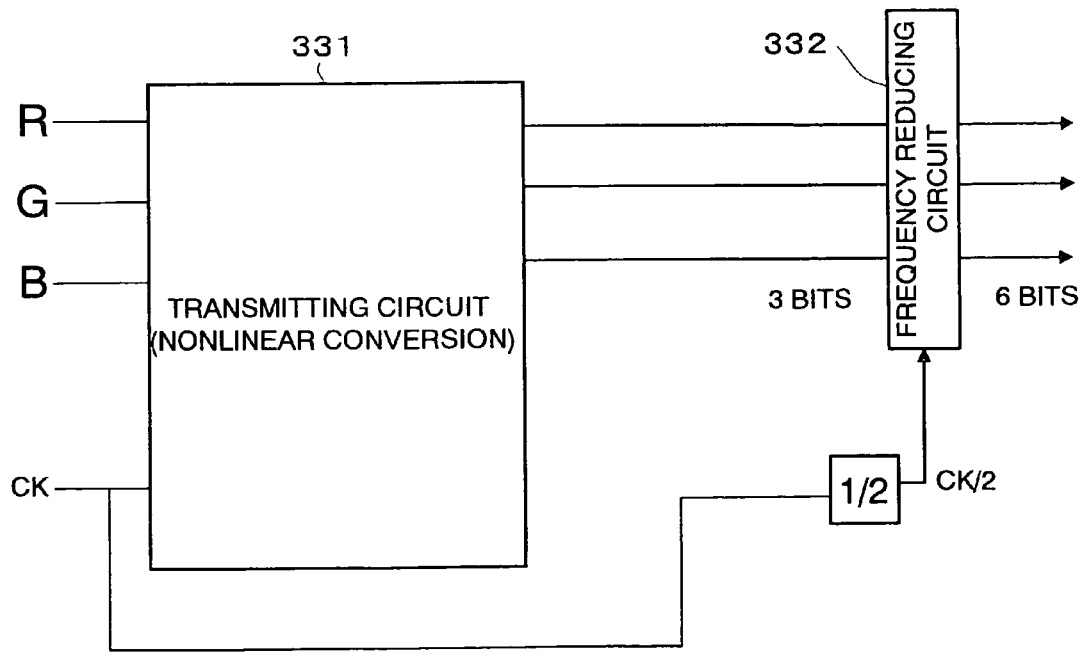
FIG. 33 is a block diagram showing a circuit configuration of a transmitting side according to a fifth embodiment of the present invention.
Figure 34:
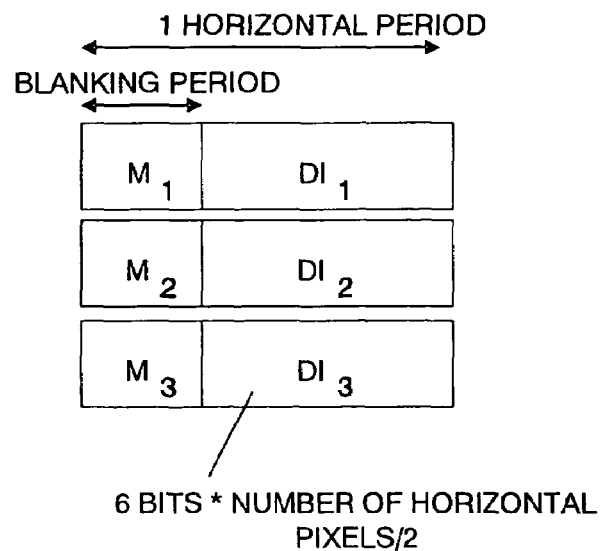
FIG. 34 is a schematic view showing signals outputted from the circuit in FIG. 33.
Figure 35:
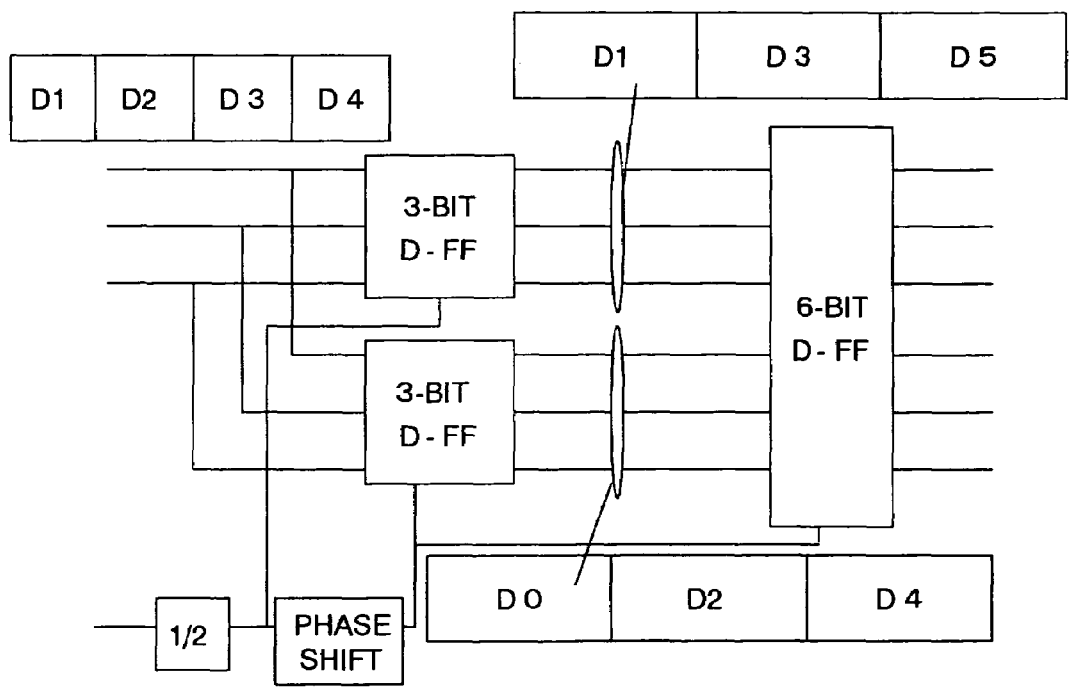
FIG. 35 is a circuit diagram showing an internal configuration of a frequency reducing circuit shown in FIG. 33.
Figure 36:
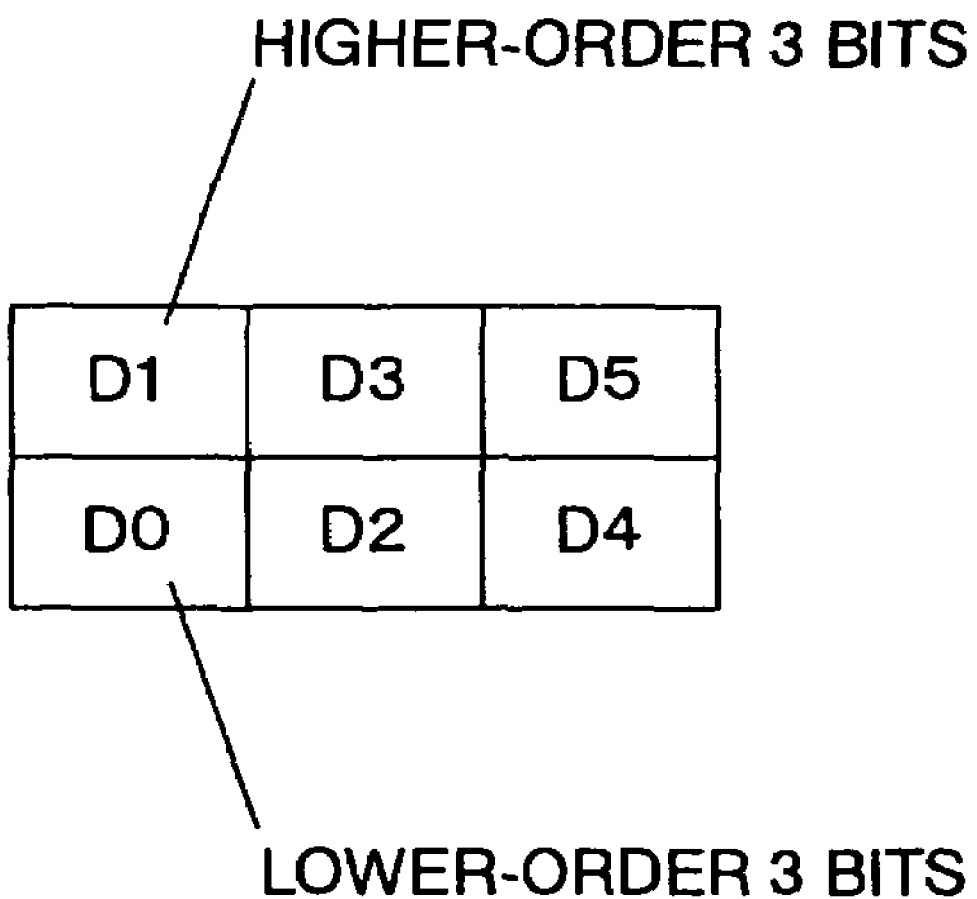
FIG. 36 is a schematic view showing signals outputted from the frequency reducing circuit.

FIG. 33 is a block diagram showing a circuit configuration of a transmitting side according to this embodiment. FIG. 34 is a schematic view showing signals outputted from the circuit in FIG. 33. FIG. 35 is a circuit diagram showing an internal configuration of a frequency reducing circuit shown in FIG. 33. FIG. 36 is a schematic view showing signals outputted from the frequency reducing circuit.

A transmitting circuit 331 outputs a difference signal that is nonlinearly converted according to a conversion table in which bit accuracy is varied according to an occurrence probability of the difference signal. Thereafter, the difference data for the two pixels are transmitted together. Note that as the nonlinear conversion table used for this nonlinear conversion, the one shown in FIG. 30 described above is usable. At this time, the frequency reducing circuit 332 is capable of reducing the frequency. For example, when 6 bits are converted to 3 bits in the transmitting circuit, 2 pixels each with 3 bits are transmitted together, which makes it possible to reduce the frequency by half.

The frequency reducing circuit 332 performs the following operations. A signal transmitted as a serial 3-bit signal with a frequency f is separated, for each pixel, into two signals by clock signals with a frequency f/2 whose sampling phases differ by 180 degrees, and thereafter, these two signals are simultaneously outputted in response to the same clock with the frequency of f/2. These two signals are transmitted as a 6-bit signal, so that the 3-bit signal with the frequency f can be converted to the 6-bit signal with the frequency f/2. Note that the 6-bit signal is reproduced as the 3-bit signals when the receiving side performs a reverse operation.

Six Embodiment

Figure 37:
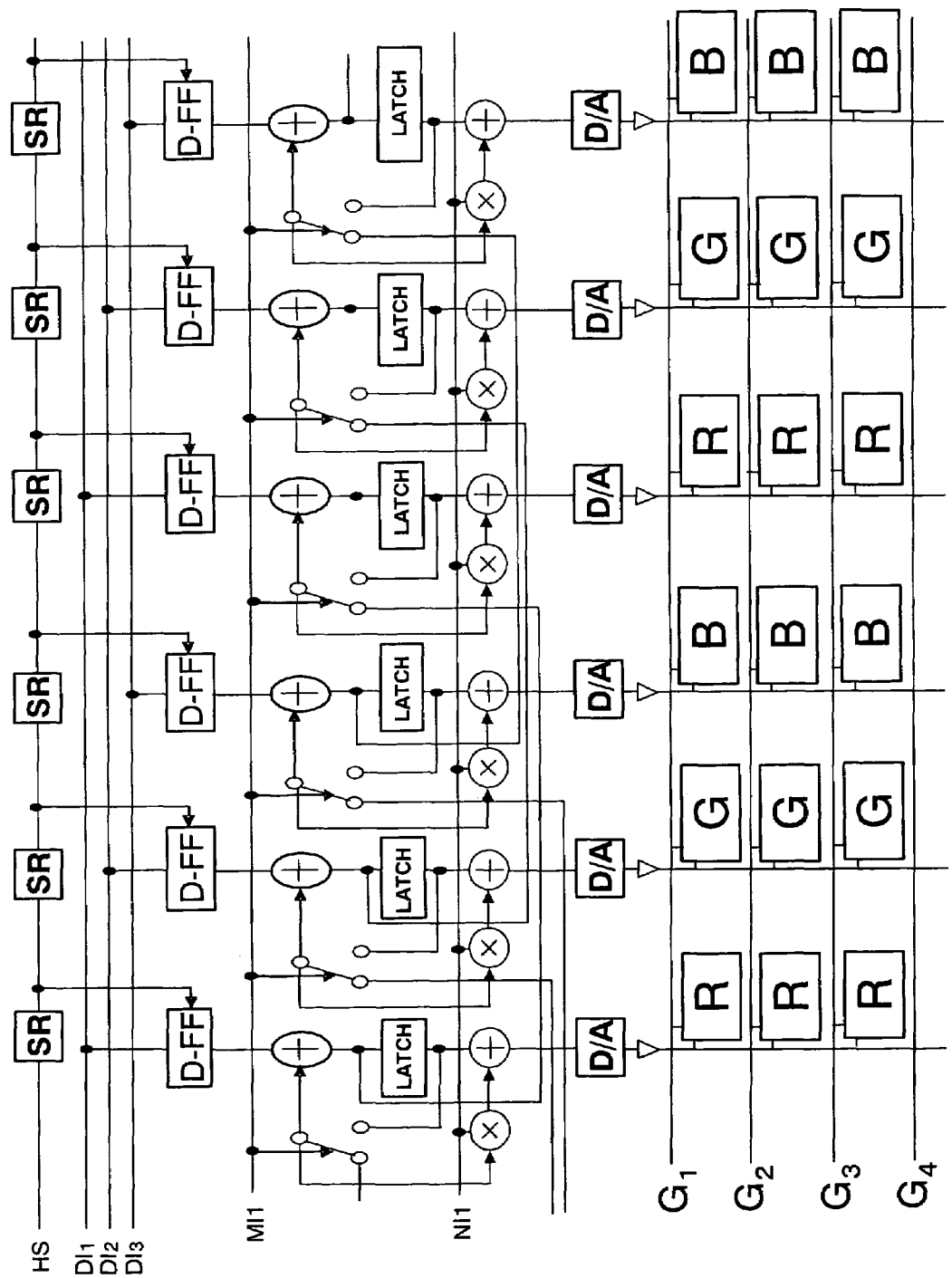
FIG. 37 is a circuit diagram showing a circuit configuration of a receiving side according to a sixth embodiment of the present invention.

A sixth embodiment of the present invention will be described. FIG. 37 is a circuit diagram showing a circuit configuration of a receiving side according to the sixth embodiment of the present invention. Here, each difference signal and each previous pixel data already retained for display are added, thereby realizing both reproduction of image data and higher quality of an image. A signal which is a difference signal with a reduced difference value (numerical value) (for example, the value is reduced to one several$^{th}$) is added to the image data reproduced by an adding circuit. As a result, it is possible to emphasize an edge portion where the image signal changes. This enables edge emphasis in a driver without any edge emphasis by a system.

Other Embodiment

Hitherto, the embodiments of the present invention have been described, but the present invention is not limited to these embodiments and can be embodied in various modified forms without departing from the spirit thereof. For example, an embodiment of the present invention is not limited to a liquid crystal display device, but the present invention is applicable to display devices in general for matrix display, such as an organic EL (electroluminescent) panel and a PDP (Plasma Display Panel).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image data processing apparatus, comprising:
a display device;
a first data dividing unit configured to divide arithmetic image data including arithmetic pixel data into first arithmetic pixel data corresponding to a first signal line of the display device;
a second data dividing unit configured to divide the arithmetic image data into second arithmetic pixel data corresponding to a second signal line of the display device;
a first adder having a first terminal to which first data being the first arithmetic pixel data is applied and a second terminal to which second data is applied, and configured to add the first data and the second data to form first added data;
a second adder having a third terminal to which third data is applied and a fourth terminal to which fourth data being the second arithmetic pixel data is applied, configured to add the third data and the fourth data to form second added data; a data delaying unit configured to delay the first added data;
a selection signal generating unit configured to generate a selection signal based on the first added data, the delayed first added data, and the second added data; and
a switching element configured to selectively apply one of the delayed first added data from the data delaying unit and the second added data from the second adder, to the second terminal of said first adder, said switching element being controlled by the selection signal.

* * * * *